US012595160B2

(12) United States Patent
Sugano et al.

(10) Patent No.: US 12,595,160 B2
(45) Date of Patent: Apr. 7, 2026

(54) CRANE SLEWING CONTROL DEVICE AND CRANE EQUIPPED WITH SAME

(71) Applicants: Kobe Steel, Ltd., Kobe (JP); KOBELCO CONSTRUCTION MACHINERY CO., LTD., Hiroshima (JP)

(72) Inventors: Naoki Sugano, Kobe (JP); Yasuo Ichikawa, Hyogo (JP); Hitoshi Kurotsu, Hyogo (JP); Takuya Watanabe, Hyogo (JP); Kazufumi Kudara, Hyogo (JP)

(73) Assignees: Kobe Steel, Ltd., Kobe (JP); KOBELCO CONSTRUCTION MACHINERY CO., LTD., Hiroshima (JP)

( * ) Notice: Subject to any disclaimer, the term of this patent is extended or adjusted under 35 U.S.C. 154(b) by 327 days.

(21) Appl. No.: 18/262,045

(22) PCT Filed: Jan. 17, 2022

(86) PCT No.: PCT/JP2022/001435

§ 371 (c)(1),
(2) Date: Jul. 19, 2023

(87) PCT Pub. No.: WO2022/163414

PCT Pub. Date: Aug. 4, 2022

(65) Prior Publication Data

US 2024/0294365 A1 Sep. 5, 2024

(30) Foreign Application Priority Data

Jan. 27, 2021 (JP) ................................ 2021-011031
Dec. 28, 2021 (JP) ................................ 2021-214157

(51) Int. Cl.
*B66C 23/86* (2006.01)

(52) U.S. Cl.
CPC .................................. *B66C 23/86* (2013.01)

(58) Field of Classification Search
None
See application file for complete search history.

(56) References Cited

U.S. PATENT DOCUMENTS

2020/0263443 A1* 8/2020 Del Real .............. E04F 21/247
2021/0269287 A1 9/2021 Iwvazawa et al.

FOREIGN PATENT DOCUMENTS

CN 103303800 * 9/2013
JP 8-119581 A 5/1996
(Continued)

OTHER PUBLICATIONS

International Search Report mailed on Mar. 8, 2022 in PCT/JP2022/001435 filed on Jan. 17, 2022 (2 pages).

*Primary Examiner* — Hongye Liang
(74) *Attorney, Agent, or Firm* — Oblon, McClelland, Maier & Neustadt, L.L.P.

(57) ABSTRACT

A slewing control device includes an attachment information acquisition unit, an angular velocity setting unit and a slewing control unit. The attachment information acquisition unit acquires attachment information for setting the maximum slewing angular velocity based on the transverse load acting on an attachment. The angular velocity setting unit sets the maximum slewing angular velocity of an upper slewing body based on the attachment information. The slewing control unit controls a slewing drive unit such that the slewing angular velocity of the upper slewing body does not exceed the maximum slewing angular velocity set by the angular velocity setting unit.

26 Claims, 17 Drawing Sheets

(56) References Cited

FOREIGN PATENT DOCUMENTS

| | | | | |
|---|---|---|---|---|
| JP | H08119582 | | * | 5/1996 |
| JP | 11-139770 | A | | 5/1999 |
| JP | 2971388 | B2 | | 11/1999 |
| JP | 2001-199676 | A | | 7/2001 |
| JP | 2001199676 | | * | 7/2001 |
| JP | 2008-143627 | A | | 6/2008 |
| JP | 2015-86017 | A | | 5/2015 |
| JP | 2020001883 | | * | 1/2020 |
| WO | WO 2020/004038 | A1 | | 1/2020 |

* cited by examiner

CRANE SLEWING CONTROL DEVICE AND CRANE EQUIPPED WITH SAME

TECHNICAL FIELD

The present invention relates to a crane slewing control device and a crane including the crane slewing control device.

BACKGROUND ART

Conventionally, as a mobile crane, a crane that includes a lower travelling body, an upper slewing body, and an attachment such as a boom and a jib is known. The attachment is attached to the front of the upper slewing body so as to be rised and lowered. When a hoist cargo is connected to a hoist cargo rope hanging down from the distal end of the attachment, the work of hoisting the hoist cargo becomes possible. In such a crane, the slewing operation of the upper slewing body may be performed with the hoist cargo being hoisted.

Patent Literature 1 discloses a crane in which a plurality of types of attachment including a boom, a fixed jib, a luffing jib, and the like can be selectively attached to and detached from the upper slewing body, and the crane includes an automatic work mode discrimination device. The automatic discrimination device includes a means for detecting the type and mounting state of the attachment, a work mode sensing device that determines the work mode of the crane based on a detection signal input from the detection means, a mode setting switch for receiving input of the work mode by a worker, a mode comparison and management device that determines whether the work mode determined by the work mode sensing device agrees with the work mode input from the mode setting switch, and a mode indicator lamp that notifies the agreement or disagreement of the two work modes. After confirming with the mode indicator lamp that an appropriate attachment corresponding to the input work mode is installed on the upper slewing body, the worker can safely perform the work.

CITATION LIST

Patent Literature

Patent Literature 1: Japanese Patent No. 2971388

While the crane described in Patent Literature 1 allows the worker to recognize that an appropriate attachment is attached to the upper slewing body, it is unknown at what degree of slewing angular velocity the installed attachment can perform the slewing operation. Therefore, there is a possibility that part of the attachment may be broken or damaged by performing the slewing operation with an excessively large slewing angular velocity, and there is a problem that excessive consideration is given to such damage to the attachment and that excessively suppressing the slewing angular velocity, resulting in deterioration of workability.

SUMMARY OF INVENTION

The present invention has been made in view of the above-described problem, and an object of the invention is to provide a crane slewing control device and a crane including the slewing control device that can efficiently inhibit a large transverse load from being applied to the attachment by the slewing operation of the upper slewing body based on the worker's slewing operation and to inhibit the attachment from being damaged or broken.

The present invention provides a crane slewing control device. The crane slewing control device is used for a crane including: a lower body; an upper slewing body supported by the lower body to be able to slew about a slewing center axis extending in an up-and-down direction with respect to the lower body; an operation unit that receives an operation to slew the upper slewing body with respect to the lower body and outputs a slewing command signal according to magnitude of the operation; a slewing drive unit capable of slewing the upper slewing body with respect to the lower body; an attachment including a proximal end pivotably supported by the upper slewing body in a hoisting direction and a distal end opposite the proximal end, the attachment being attachable to and detachable from the upper slewing body; and a hoist cargo rope hanging down from the distal end of the attachment and connected to a hoist cargo. The crane slewing control device includes an attachment information acquisition unit, an angular velocity setting unit, and a slewing control unit. The attachment information acquisition unit acquires attachment information. The attachment information is information peculiar to the attachment for setting a maximum slewing angular velocity that is a maximum value of a slewing angular velocity based on a transverse load that is a load along a slewing direction of the upper slewing body acting on the attachment due to the slewing angular velocity of the upper slewing body. The angular velocity setting unit sets the maximum slewing angular velocity that is allowed in a slewing operation of the upper slewing body based on at least the attachment information acquired by the attachment information acquisition unit. The slewing control unit receives the slewing command signal output from the operation unit and controls the slewing drive unit to cause the upper slewing body to slew with respect to the lower body in response to the slewing command signal. The slewing control unit controls the slewing drive unit such that the slewing angular velocity of the upper slewing body does not exceed the maximum slewing angular velocity set by the angular velocity setting unit.

The present invention provides a crane. The crane includes: a lower body; an upper slewing body supported by the lower body to be able to slew about a slewing center axis extending in an up-and-down direction with respect to the lower body; an operation unit that receives an operation to slew the upper slewing body with respect to the lower body and outputs a slewing command signal according to magnitude of the operation; a slewing drive unit capable of slewing the upper slewing body with respect to the lower body; an attachment including a proximal end pivotably supported by the upper slewing body in a hoisting direction and a distal end opposite the proximal end, the attachment being attachable to and detachable from the upper slewing body; a hoist cargo rope hanging down from the distal end of the attachment and connected to a hoist cargo; and the slewing control device described above that controls the slewing drive unit such that the slewing angular velocity of the upper slewing body does not exceed at least the maximum slewing angular velocity set according to the attachment information on the attachment.

DESCRIPTION OF EMBODIMENTS

First Embodiment

Figure 1:
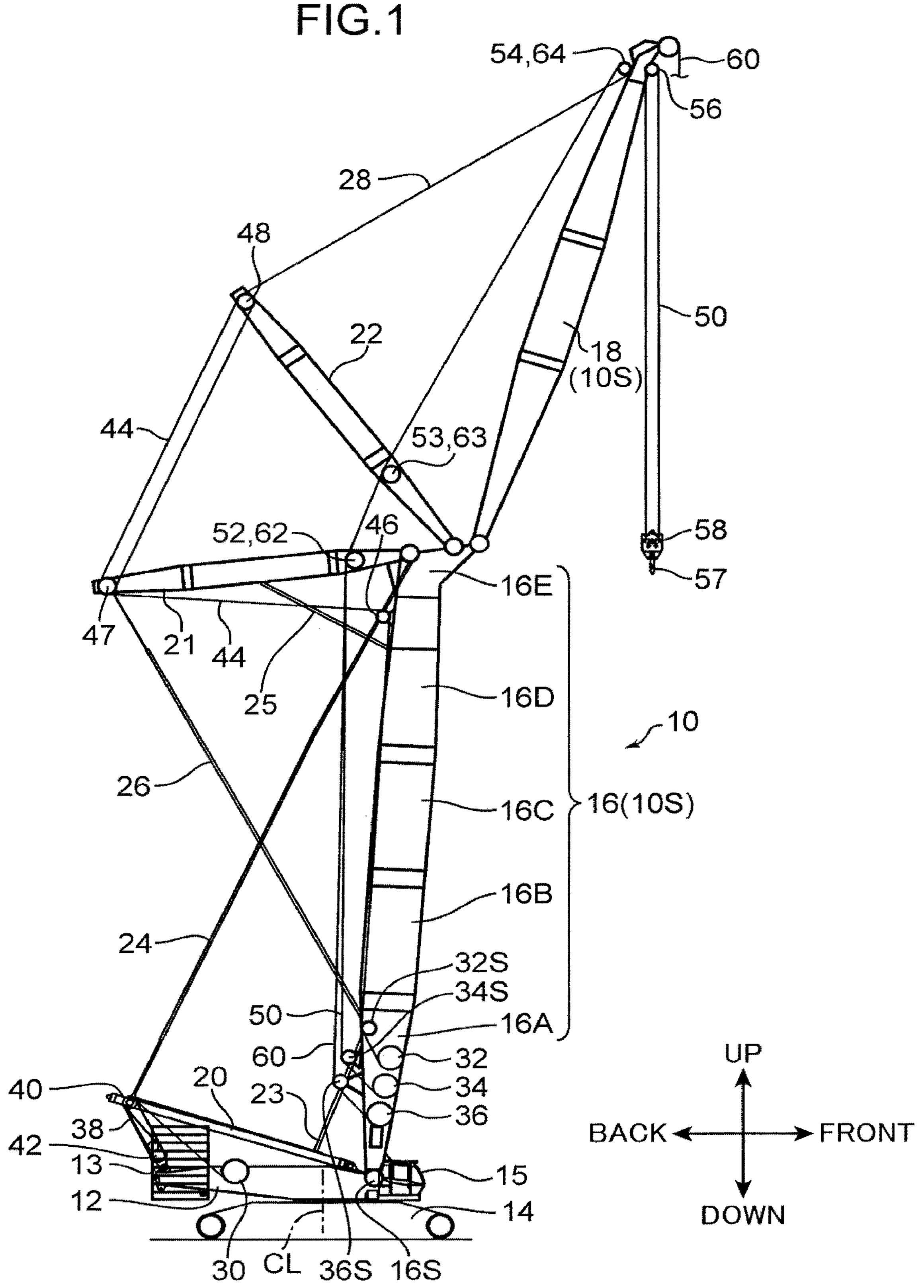
FIG. 1 is a side view of a crane including a slewing control device according to a first embodiment of the present invention.

Embodiments of the present invention will be described below with reference to the drawings. FIG. 1 is a side view of a crane 10 according to a first embodiment of the present invention. Note that hereinafter, each figure shows the directions "up", "down", "front" and "back", but the directions are shown for convenience to describe the structure and assembly method of the crane 10 according to each embodiment, and do not limit the direction of movement, mode of use, and the like of the crane according to the present invention.

The crane 10 includes an upper slewing body 12 corresponding to a crane body, a lower travelling body 14 (lower body) that slewably supports the upper slewing body 12, an attachment 10S (also referred to as a hoisting body) including a boom 16 and a jib 18, and a mast 20 that is a boom hoisting member. The upper slewing body 12 is supported by the lower travelling body 14 to be able to slew about a slewing center axis CL extending in an up-and-down direction with respect to the lower travelling body 14. A counterweight 13 for adjusting the balance of the crane 10 is loaded on the rear portion of the upper slewing body 12. A cab 15 is provided at a front end of the upper slewing body 12. The cab 15 corresponds to a driver's seat of the crane 10.

The attachment 10S includes a proximal end pivotably supported by the upper slewing body 12 in the hoisting direction and a distal end opposite the proximal end, and is detachable from the upper slewing body 12. As described above, in the present embodiment, the attachment 10S includes the boom 16 and the jib 18.

The boom 16 shown in FIG. 1 is a so-called lattice type and includes a lower boom 16A, one or more (three in the illustrative example) intermediate booms 16B, 16C, and 16D), and an upper boom 16E. Specifically, the lower boom 16A is coupled to the front of the upper slewing body 12 pivotably in the hoisting direction. The intermediate booms 16B, 16C, and 16D are detachably joined in that order to the distal side of the lower boom 16A. The upper boom 16E is detachably joined to the distal side of the intermediate boom 16D. The jib 18, and a rear strut 21 and a front strut 22 for pivoting the jib 18 are each pivotably coupled to the distal end of the upper boom 16E. The boom 16 is pivotably supported by the upper slewing body 12 about a rotation axis extending in the left-right direction with a boom foot pin 16S provided at a lower end as a fulcrum.

The boom 16 includes an intermediate boom sheave 46 and respective idler sheaves 32S, 34S, and 36S. The intermediate boom sheave 46 is disposed on the rear side surface of the distal side of the intermediate boom 16D. The idler sheave 32S, the idler sheave 34S, and the idler sheave 36S are rotatably supported by the rear side surface of the proximal end of the boom 16.

However, the specific structure of the boom is not limited in the present invention. For example, the boom may have no intermediate member, or may have a different number of intermediate members. Furthermore, the boom may include a single member.

The specific structure of the jib 18 is also not limited. The proximal end of the jib 18 is pivotably coupled to (supported by) the distal end of the upper boom 16E of the boom 16, and the pivotal axis of the jib 18 is a transverse axis parallel to the pivotal axis of the boom 16 with respect to the upper slewing body 12 (boom foot pin 16S).

The mast 20 includes a base end and a pivotal end, and the base end is pivotably coupled to the upper slewing body 12. The pivotal axis of the mast 20 is parallel to the pivotal axis of the boom 16 and is located immediately rearward of the pivotal axis of the boom 16. That is, this mast 20 is pivotable in the same direction as the hoisting direction of the boom 16. Meanwhile, the pivotal end of the mast 20 is coupled to the end of the boom 16 via one pair of left and right boom guy lines 24. This coupling allows the pivot of the mast 20 and the pivot of the boom 16 to cooperate with each other.

Furthermore, the crane 10 includes one pair of left and right backstops 23, the rear strut 21, the front strut 22, one pair of left and right strut backstops 25 and guy lines 26, and one pair of left and right jib guy lines 28.

The one pair of left and right backstops 23 are provided on left and right sides of the lower boom 16A of the boom 16. These backstops 23 abut on the central portion of the upper slewing body 12 in the front-rear direction when the boom 16 reaches the standing posture shown in FIG. 1. This abutment restricts the boom 16 from being blown backward by strong wind or the like.

The rear strut 21 is pivotably supported by the distal end of the boom 16. The rear strut 21 is held in a posture protruding from the tip of the upper boom 16E to the boom standing side (left side in FIG. 1). As a means for holding this posture, the one pair of left and right strut backstops 25 and the one pair of left and right guy lines 26 are interposed between the rear strut 21 and the boom 16. The strut backstops 25 are interposed between the intermediate boom 16D and the intermediate portion of the rear strut 21, and support the rear strut 21 from below. The guy lines 26 are stretched to connect the distal end of the rear strut 21 to the lower boom 16A of the boom 16, and regulates the position of the rear strut 21 by tension thereof. Note that the rear strut 21 includes a sheave block 47 and rear strut idler sheaves 52 and 62. The sheave block 47 is disposed at the pivotal end of the rear strut 21 and includes a plurality of sheaves arranged in the width direction. The rear strut idler sheaves 52 and 62 are disposed at a portion located closer to the proximal end than the central portion of the rear strut 21 in the longitudinal direction, and include a plurality of sheaves each arranged in the width direction.

The front strut 22 is disposed rearward of the jib 18, and is pivotably supported by the distal end of the boom 16 (upper boom 16E) so as to pivot together with the jib 18. In detail, the one pair of left and right jib guy lines 28 is stretched to couple the distal end of the front strut 22 to the distal end of the jib 18. Therefore, this pivotable drive of the front strut 22 also drives the jib 18 to pivot as one body with the front strut 22. Note that the above-described rear strut 21 is disposed rearward of the front strut 22 as shown in FIG. 1, and forms a substantial isosceles triangular shape with the front strut 22. The front strut 22 includes a sheave block 48 and front strut idler sheaves 53 and 63. The sheave block 48 is disposed at the pivotal end of the front strut 22 and includes a plurality of sheaves arranged in the width direction. The front strut idler sheaves 53 and 63 are disposed at a portion located closer to the proximal end than the central portion of the front strut 22 in the longitudinal direction, and include a plurality of sheaves each arranged in the width direction.

The crane 10 further includes various winches. Specifically, the crane 10 includes a boom hoisting winch 30 for hoisting the boom 16, a jib hoisting winch 32 for pivoting the jib 18 in the hoisting direction, and a main winding winch 34 and an auxiliary winding winch 36 for winding up and down the hoist cargo. The crane 10 includes a boom hoisting rope 38, a jib hoisting rope 44, a main winding rope 50 (hoist cargo rope), and an auxiliary winding rope 60. In the crane 10 according to the present embodiment, the jib hoisting winch 32, the main winding winch 34, and the auxiliary winding winch 36 are installed near the base end of the boom 16. The boom hoisting winch 30 is installed on the upper slewing body 12. Positions of these winches 30, 32, 34, and 36 are not limited to the above-described positions.

The boom hoisting winch 30 winds up and pays out the boom hoisting rope 38. Then, the boom hoisting rope 38 is routed such that the mast 20 is pivoted by the winding up and paying out. Specifically, sheave blocks 40 and 42 each having a plurality of sheaves arranged in the width direction are provided at the pivoting end of the mast 20 and the rear end of the upper slewing body 12, and the boom hoisting rope 38 drawn from the boom hoisting winch 30 is put between the sheave blocks 40 and 42. Therefore, by the boom hoisting winch 30 winding up and paying out the boom hoisting rope 38, the distance between both sheave blocks 40 and 42 changes, whereby the mast 20 and the boom 16 interlocked therewith pivot in the hoisting direction.

The jib hoisting winch 32 winds up and pays out the jib hoisting rope 44 that is put between the rear strut 21 and the front strut 22. Then, the jib hoisting rope 44 is routed such that the front strut 22 is pivoted by the winding up and paying out. Specifically, the jib hoisting rope 44 drawn from the jib hoisting winch 32 is put round the idler sheave 32S and the intermediate boom sheave 46, and is further put a plurality of times between the sheave blocks 47 and 48. Therefore, the jib hoisting winch 32 changes the distance between both sheave blocks 47 and 48 by winding up and paying out the jib hoisting rope 44, and causes the front strut 22 to relatively pivot with respect to the rear strut 21. As a result, the jib hoisting winch 32 hoists and lowers the jib 18 interlocked with the front strut 22.

The main winding winch 34 winds up and down the hoist cargo with the main winding rope 50. With regard to this main winding, as described above, the rear strut idler sheave 52, the front strut idler sheave 53, and a main winding guide sheave 54 are rotatably provided near the base end of the rear strut 21, near the base end of the front strut 22, and at the distal end of the jib 18, respectively. Furthermore, a main winding sheave block in which a plurality of main winding point sheaves 56 is arranged in the width direction is provided at a position adjacent to the main winding guide sheave 54. The main winding rope 50 drawn from the main winding winch 34 is put round the idler sheave 34S, the rear strut idler sheave 52, the front strut idler sheave 53, and the main winding guide sheave 54 in this order, and is put between the main winding point sheave 56 of the sheave block and a sheave 58 of the sheave block provided in a main hook 57 for the hoist cargo. Therefore, when the main winding winch 34 winds up or pays out the main winding rope 50, the distance between both sheaves 56 and 58 changes, and the main hook 57 coupled to the main winding rope 50 hanging down from the tip of the jib 18 is wound up and down. In this way, in the present embodiment, the main winding rope 50 (hoist cargo rope) hangs down from the distal end of the attachment 10S and is connected to the hoist cargo via the main hook 57.

Similarly, the auxiliary winding winch 36 winds up and down the hoist cargo with the auxiliary winding rope 60. With regard to this auxiliary winding, the rear strut idler sheave 62, the front strut idler sheave 63, and an auxiliary winding guide sheave 64 are rotatably provided coaxially with the rear strut idler sheave 52, the front strut idler sheave 53, and the main winding guide sheave 54, respectively. An auxiliary winding point sheave (not shown) is rotatably provided at a position adjacent to the auxiliary winding guide sheave 64. The auxiliary winding rope 60 drawn from the auxiliary winding winch 36 is put round the rear strut idler sheave 62, the front strut idler sheave 63, and the auxiliary winding guide sheave 64 in this order, and hangs down from the auxiliary winding point sheave. Therefore, when the auxiliary winding winch 36 winds up or pays out the auxiliary winding rope 60, an auxiliary hook for the hoist cargo (not shown) coupled to the end of the auxiliary winding rope 60 is wound up or down.

Figure 2:
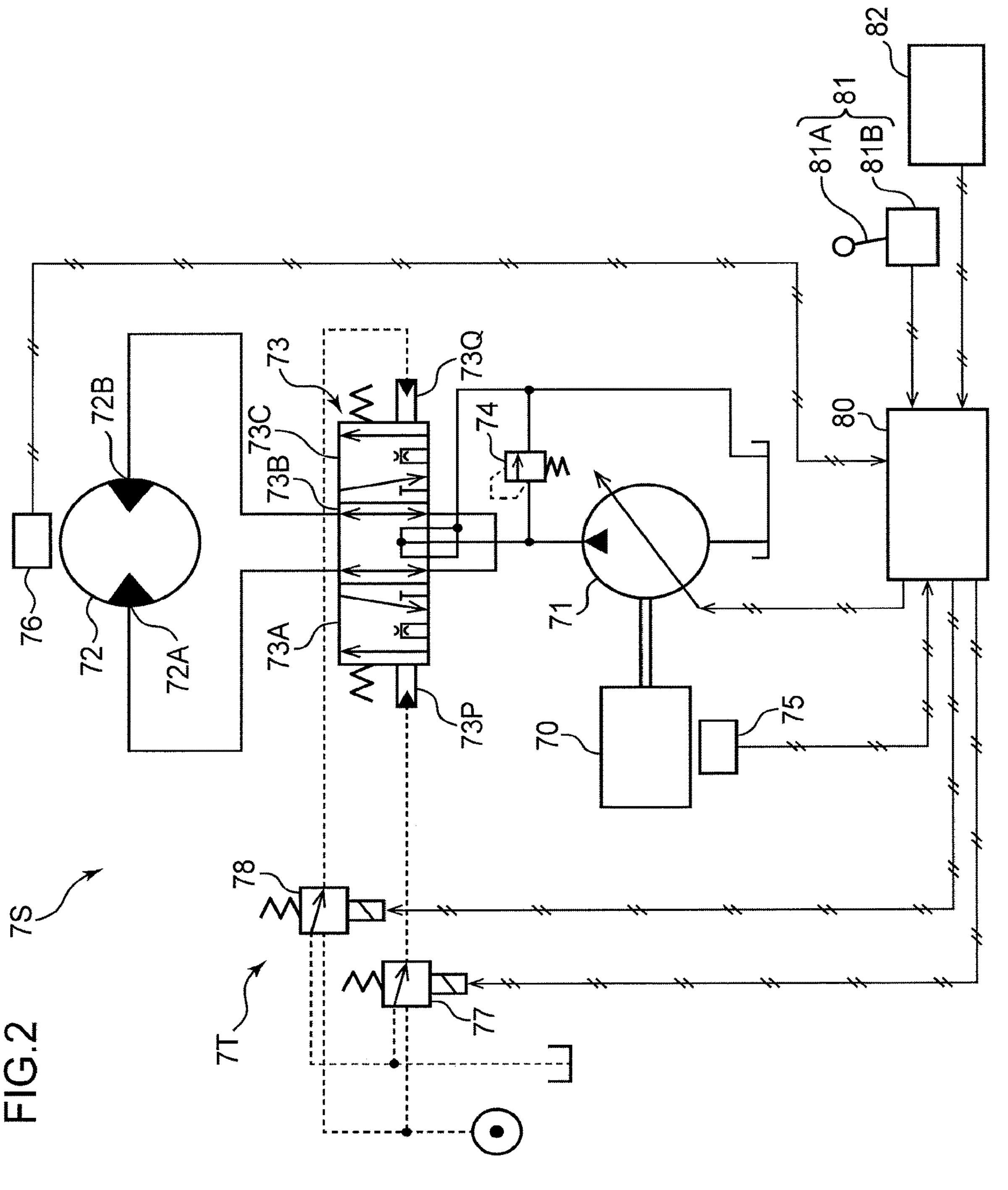
FIG. 2 is a hydraulic circuit diagram of a slewing drive unit of the crane according to the first embodiment of the present invention.
Figure 3:
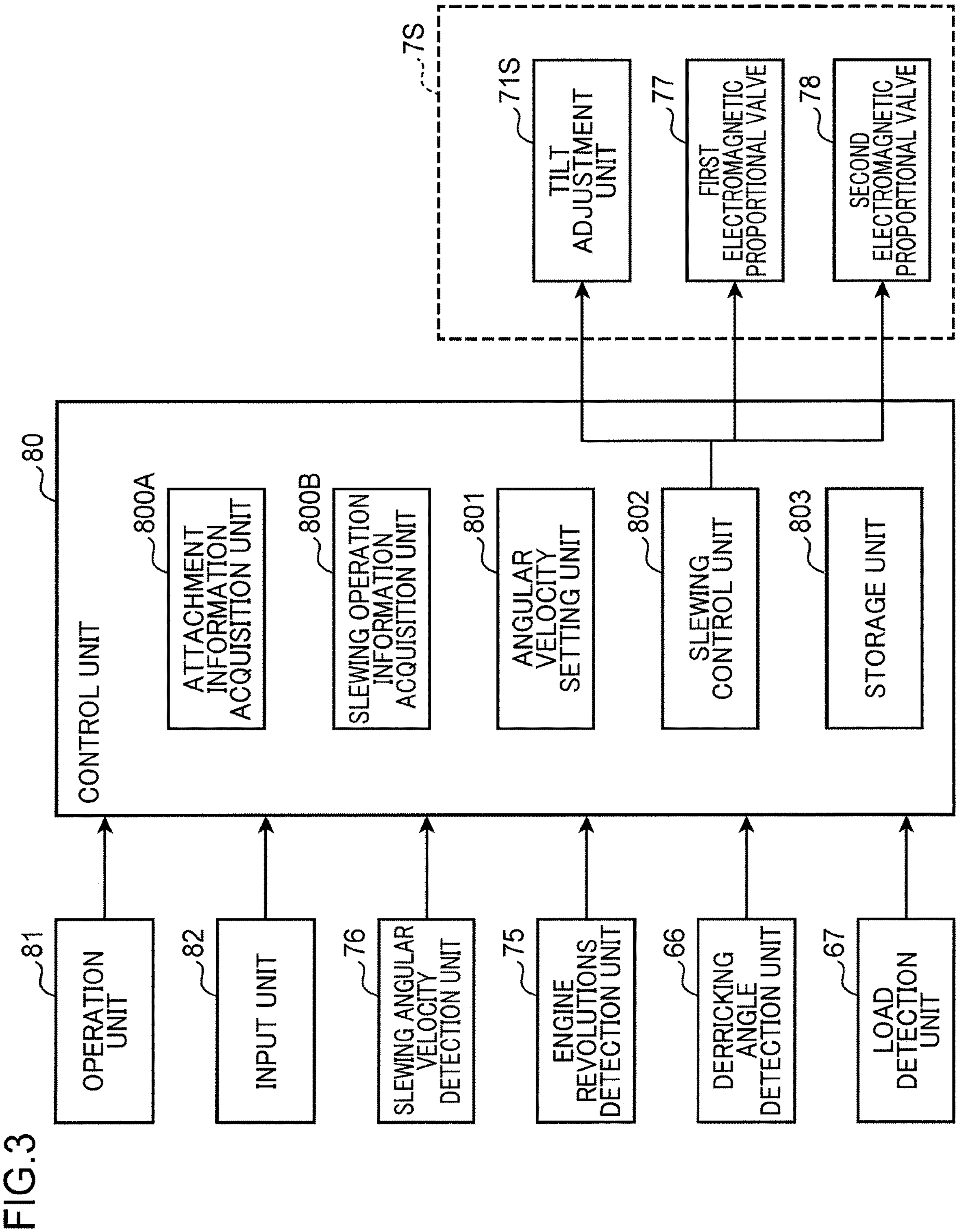
FIG. 3 is a block diagram of the slewing control device according to the first embodiment of the present invention.

FIG. 2 is a hydraulic circuit diagram of a slewing drive unit 7S of the crane 10 according to the present embodiment. FIG. 3 is a block diagram of a slewing control device 8S according to the present embodiment. The crane 10 includes the slewing drive unit 7S and the slewing control device 8S. The slewing drive unit 7S can slew the upper slewing body 12 with respect to the lower travelling body 14 (slewing operation). When the slewing operation of the upper slewing body 12 is performed in the crane 10, to prevent damage in the attachment 10S (boom 16, jib 18), the slewing control device 8S slews the upper slewing body 12 while limiting the slewing angular velocity of the upper slewing body 12.

With reference to FIG. 2, the slewing drive unit 7S includes an engine 70, a hydraulic pump 71 including a tilt adjustment unit 71S (FIG. 3), a slewing motor 72, a control valve 73, a relief valve 74, an engine revolutions detection unit 75, a slewing angular velocity detection unit 76, a first electromagnetic proportional valve 77, and a second electromagnetic proportional valve 78. The crane 10 further includes a control unit 80, an operation unit 81, and an input unit 82. Furthermore, with reference to FIG. 3, the crane 10 further includes a derricking angle detection unit 66 and a load detection unit 67.

The engine 70 includes an output shaft. In the present embodiment, the engine 70 can be switched between a HIGH idle mode and a LOW idle mode according to the worker's operation (input). The number of revolutions of the output shaft in the HIGH idle mode is set higher than the number of revolutions of the output shaft in the LOW idle mode. The HIGH idle mode is selected by the worker when working with a relatively large load.

The hydraulic pump 71 is coupled to the output shaft of the engine 70 and receives power input from the output shaft, and sucks from a tank and discharges a hydraulic oil to be supplied to the slewing motor 72. This hydraulic pump 71 according to the embodiment includes a variable displacement type hydraulic pump. The capacity (push-off volume) of the hydraulic pump 71 changes by the input of a tilt command signal to the tilt adjustment unit 71S (regulator) included in the hydraulic pump 71, thereby changing the pump discharge flow rate, which is the flow rate of the hydraulic oil discharged from the hydraulic pump 71. In other words, the hydraulic pump 71 can receive input of the tilt command signal and change the maximum discharge amount of the hydraulic oil according to the magnitude of the tilt command signal. Note that the tilt command signal described above is output from a slewing control unit 802 of the control unit 80 to be described later (FIG. 3).

The slewing motor 72 is a hydraulic slewing motor that drives and slews the upper slewing body 12. The slewing motor 72 includes a plurality of hydraulic chambers inside, receives the hydraulic oil supplied from the hydraulic pump 71 to one of the plurality of hydraulic chambers, and discharges the hydraulic oil from another hydraulic chamber of the plurality of hydraulic chambers, thereby generating the driving force to slew the upper slewing body 12. Specifically, the slewing motor 72 is disposed to be interposed between the upper slewing body 12 and the lower travelling body 14 of FIG. 1. The slewing motor 72 includes a motor shaft including a pinion and is fixed to the upper slewing body 12. Meanwhile, the lower travelling body 14 includes a circumferentially formed slewing gear (not shown). The pinion of the slewing motor 72 and the slewing gear mesh with each other, whereby the upper slewing body 12 slews according to the rotation of the slewing motor 72. Therefore, the slewing motor 72 is disposed to be positioned near the circumference of the slewing gear. The slewing motor 72 includes a motor first port 72A and a motor second port 72B. The slewing motor 72 slews the upper slewing body 12 in a first direction (for example, left direction) by being supplied with the hydraulic oil through the motor first port 72A, and discharges the hydraulic oil through the motor second port 72B. Meanwhile, the slewing motor 72 slews the upper slewing body 12 in a second direction opposite the first direction (for example, right direction) by being supplied with the hydraulic oil through the motor second port 72B, and discharges the hydraulic oil through the motor first port 72A.

The control valve 73 is disposed in a hydraulic oil path to be interposed between the hydraulic pump 71 and the slewing motor 72. The control valve 73 operates to switch the direction of hydraulic oil supply from the hydraulic pump 71 to the slewing motor 72, and to adjust the flow rate of the hydraulic oil. The control valve 73 is connected to each of the motor first port 72A and the motor second port 20B of the slewing motor 72.

The control valve 73 operates to switch among a left slewing position 73A (first slewing position), neutral position 73B (neutral slewing position), and right slewing position 73C (second slewing position) according to pilot pressure input to the control valve 73. The control valve 73 includes one pair of pilot ports, that is, a left slewing pilot port 73P and a right slewing pilot port 73Q. The control valve 73 is kept at the neutral position 73B when the pilot pressure is not input to either the left slewing pilot port 73P or the right slewing pilot port 73Q. The control valve 73 is switched to the left slewing position 73A when the pilot pressure is input to the left slewing pilot port 73P, and is switched to the right slewing position 73C when the pilot pressure is input to the right slewing pilot port 73Q. Then, the control valve 73 is opened with an opening area according to the pilot pressure to change the flow rate of the hydraulic oil.

At the left slewing position 73A, the control valve 73 forms an oil path that supplies the hydraulic oil discharged from the hydraulic pump 71 to the motor first port 72A and guides the hydraulic oil discharged from the motor second port 72B to the tank. At the right slewing position 73C, the control valve 73 forms an oil path that supplies the hydraulic oil discharged from the hydraulic pump 71 to the motor second port 72B and guides the hydraulic oil discharged from the motor first port 72A to the tank. At the neutral position 73B, the control valve 73 allows the hydraulic oil to circulate between the motor first port 72A and the motor second port 72B.

The relief valve 74 operates to prevent the pressure in the oil path (bleed off-line) between the control valve 73 and the tank from exceeding predetermined pressure.

The engine revolutions detection unit 75 detects the rotational speed (or the number of revolutions) of the output shaft of the engine 70. The slewing angular velocity detection unit 76 detects the rotational speed (or the number of revolutions) of the slewing motor 72. The slewing angular velocity detection unit 76 detects the rotation direction of the slewing motor 72 (first direction or second direction).

The operation unit 81 is disposed in the cab 15 (FIG. 1) and is operated by the worker for the hoisting operation of the attachment 10S and the slewing operation of the upper slewing body 12. The operation unit 81 regarding the slewing operation of the upper slewing body 12 will be described below. The operation unit 81 receives an operation for slewing the upper slewing body 12 with respect to the lower travelling body 14, outputs a slewing command signal according to the magnitude of the operation, and inputs the signal to the control unit 80. The operation unit 81 includes an operation lever 81A and a remote control unit 81B. The operation lever 81A can be selectively operated in a first operating area to slew the upper slewing body 12 in the first direction, a second operating area to slew the upper slewing body 12 in the second direction, and a neutral operating area between the first and second operating areas. The operation amount of the operation lever 81A in each of the first and second operating areas is variable.

When the operation lever 81A is operated by the worker in the first operating area (first slewing operation), the remote control unit 81B inputs a signal according to the operation amount the operation lever 81A receives to the control unit 80. When the operation lever 81A is operated by the worker in the second operating area (second slewing operation), the remote control unit 81B inputs a signal according to the operation amount the operation lever 81A receives to the control unit 80. As a result, a command signal is input from the control unit 80 to the first electromagnetic proportional valve 77 and the second electromagnetic proportional valve 78.

The first electromagnetic proportional valve 77 and the second electromagnetic proportional valve 78 adjust the pilot pressure input to the control valve 73 in response to the command signal given by the slewing control unit 802 of the control unit 80. Specifically, the first electromagnetic proportional valve 77 and the second electromagnetic proportional valve 78 are interposed between a pilot hydraulic source and the left slewing pilot port 73P and the right slewing pilot port 73Q of the control valve 73, and are connected to the left slewing pilot port 73P and the right slewing pilot port 73Q via pilot lines, respectively. The first electromagnetic proportional valve 77 opens to reduce the pilot pressure supplied to the left slewing pilot port 73P when the command signal is given from the slewing control unit 802 (FIG. 3). The second electromagnetic proportional valve 78 opens to reduce the pilot pressure supplied to the right slewing pilot port 73Q when the command signal is given from the slewing control unit 802. At this time, the stroke amount of the spool of the control valve 73 changes according to the change in the pilot pressure input to the left slewing pilot port 73P and the right slewing pilot port 73Q.

The input unit 82 receives input of various pieces of information by the worker. The information input from the input unit 82 is housed (stored) in a storage unit 803 of the control unit 80 to be described later. The worker can input (switch) on/off of performing slewing control performed by the slewing control device 8S according to the present embodiment through an operating switch (not shown) included in the input unit 82.

The derricking angle detection unit 66 detects the derricking angle of the attachment 10S, that is, relative angle with respect to the ground. In the present embodiment, the derricking angle detection unit 66 can detect each of the derricking angle (ground angle) of the boom 16 and the derricking angle of the jib 18.

The load detection unit 67 detects the load of the hoist cargo (hoist cargo load) connected to the main winding rope 50 (auxiliary winding rope 60). The load detection unit 67 includes a tension sensor installed in the main winding winch 34 (auxiliary winding winch 36) and the like.

The control unit 80 controls the entire operation of the crane 10, and is electrically connected to the operation unit 81, the input unit 82, the slewing angular velocity detection unit 76, the engine revolutions detection unit 75, the derricking angle detection unit 66, the load detection unit 67, the tilt adjustment unit 71S, the first electromagnetic proportional valve 77, the second electromagnetic proportional valve 78, and the like as a destination of sending and receiving the control signal. Note that the control unit 80 is also electrically connected to other units provided in the crane 10.

The control unit 80 includes a central processing unit (CPU), a read only memory (ROM) to store a control program, a random access memory (RAM) used as a work area for the CPU, and the like. By the CPU executing the control program, the control unit 80 operates to functionally include an attachment information acquisition unit 800A, a slewing operation information acquisition unit 800B (slewing information acquisition unit), an angular velocity setting unit 801, the slewing control unit 802, and the storage unit 803.

The attachment information acquisition unit 800A acquires attachment information. The attachment information is information for setting the maximum slewing angular velocity, which is the maximum value of the slewing angular velocity, based on a transverse load acting on the attachment 10S. As one example, the attachment information is information peculiar to the attachment 10S related to at least one of the strength of the attachment 10S against the transverse load and the magnitude of the transverse load. That is, the attachment information is information equipped by the attachment 10S even with the attachment 10S detached from the upper slewing body 12. Note that the transverse load is a load along the slewing direction of the upper slewing body 12 acting on the attachment 10S in association with the slewing operation of the upper slewing body 12. As one example, the attachment information includes the length of the attachment 10S from the proximal end to the distal end, and is input by the worker through the input unit 82.

The slewing operation information acquisition unit 800B acquires slewing operation information (slewing information). The slewing operation information is information related to the condition of the slewing operation of the upper slewing body 12 for setting the maximum slewing angular velocity. In other words, the slewing operation information is information about the condition of the slewing operation of the upper slewing body 12 with the attachment 10S attached to the upper slewing body 12, and is information related to the magnitude of the transverse load. As one example, the slewing operation information includes the hoist cargo load, the working radius of the attachment 10S, and the like. The working radius is the distance from the proximal end to the distal end of the attachment 10S (jib 18) in plan view.

The angular velocity setting unit 801 sets the maximum slewing angular velocity that is the maximum value of the slewing angular velocity of the upper slewing body 12 that is allowed in the slewing operation of the upper slewing body 12 based on at least the attachment information acquired by the attachment information acquisition unit 800A. The angular velocity setting unit 801 may set the maximum slewing angular velocity based on the attachment information acquired by the attachment information acquisition unit 800A and the slewing operation information acquired by the slewing operation information acquisition unit 800B.

The slewing control unit 802 receives the slewing command signal output from the operation unit 81 and controls the slewing drive unit 7S such that the upper slewing body 12 slews with respect to the lower travelling body 14 in response to the slewing command signal. The slewing control unit 802 controls the slewing drive unit 7S such that the slewing angular velocity of the upper slewing body 12 does not exceed the maximum slewing angular velocity that is set by the angular velocity setting unit 801. In the present embodiment, the slewing control unit 802 limits the discharge amount of the hydraulic oil to be discharged from the hydraulic pump 71 such that the slewing angular velocity of the upper slewing body 12 does not exceed the set maximum slewing angular velocity, by inputting the tilt command signal corresponding to the maximum slewing angular velocity that is set by the angular velocity setting unit 801 into the hydraulic pump 71.

The storage unit 803 houses and outputs information such as various parameters and thresholds to be referred to by the slewing control device 8S in the operation of the crane 10. The storage unit 803 stores a limit value map described later to be referred to by the angular velocity setting unit 801.

Note that the control valve 73, the first electromagnetic proportional valve 77, and the second electromagnetic proportional valve 78 constitute a flow rate adjustment mechanism 7T according to the present embodiment. The flow rate adjustment mechanism 7T adjusts the flow rate of the hydraulic oil supplied to the slewing motor 72, out of the hydraulic oil discharged from the hydraulic pump 71 in response to the slewing command signal output from the operation unit 81. The engine 70, the hydraulic pump 71, the slewing motor 72, and the flow rate adjustment mechanism 7T constitute the slewing drive unit 7S described above. Furthermore, the control unit 80, the engine revolutions detection unit 75, the slewing angular velocity detection unit 76, the derricking angle detection unit 66, and the load detection unit 67 constitute the slewing control device 8S in the present embodiment. The slewing control device 8S is used for the crane 10.

Note that FIG. 2 shows the hydraulic circuit related to the slewing operation of the upper slewing body 12 of the crane 10, but the crane 10 includes a hydraulic circuit (not shown) related to the travelling operation of the lower travelling body 14, the hoisting operation of the boom 16 and the jib 18, and the winding up and down operation of the main winding rope 50 and the auxiliary winding rope 60. In the hoisting operation of the boom 16 and the jib 18, the boom hoisting winch 30 and the jib hoisting winch 32 are driven to rotate in response to the operation input to the operation unit 81, respectively. In the winding up and down operation of the main winding rope 50 and the auxiliary winding rope 60, the main winding winch 34 and the auxiliary winding winch 36 are driven to rotate in response to the operation input to the operation unit 81, respectively.

<About Swing of Attachment in Slewing Operation>

Figure 4:
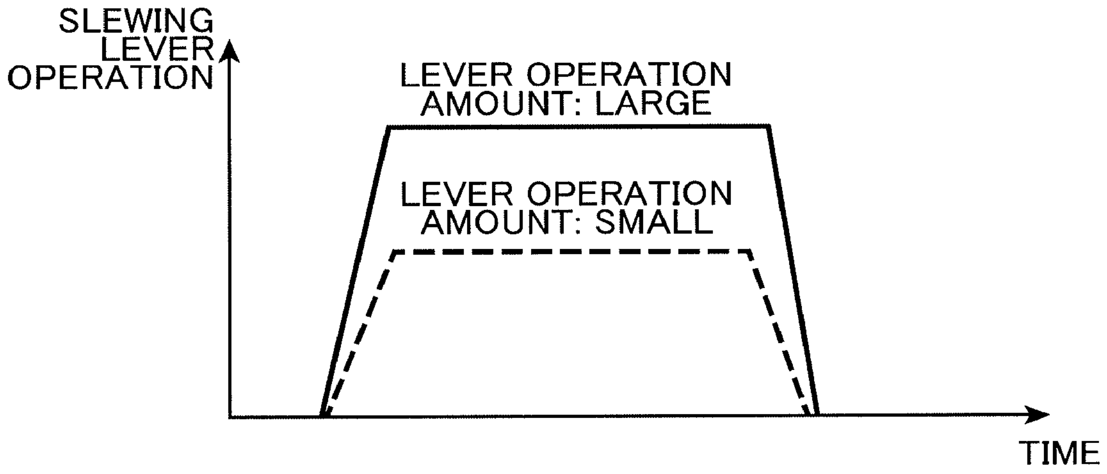
FIG. 4 is a graph showing the change of an operation amount received by an operation lever when the crane performs a slewing operation.
Figure 5:
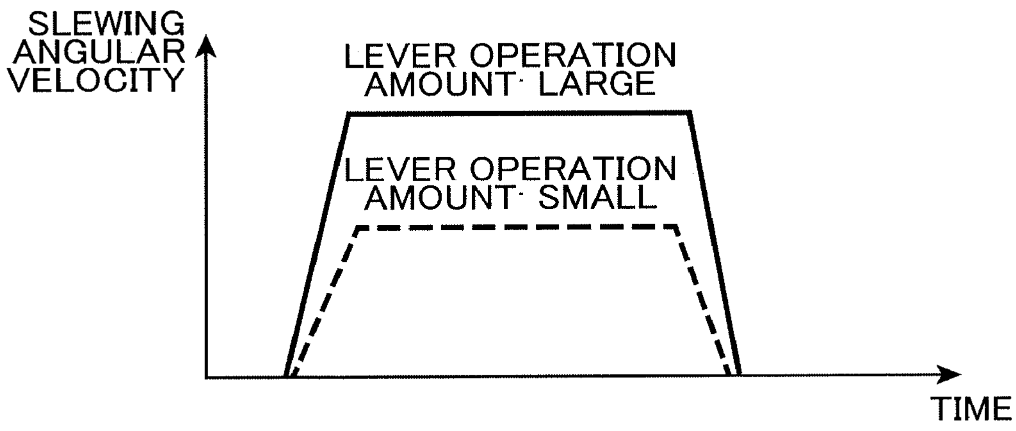
FIG. 5 is a graph showing the change of a slewing angular velocity of an upper slewing body when the crane performs the slewing operation.
Figure 6:
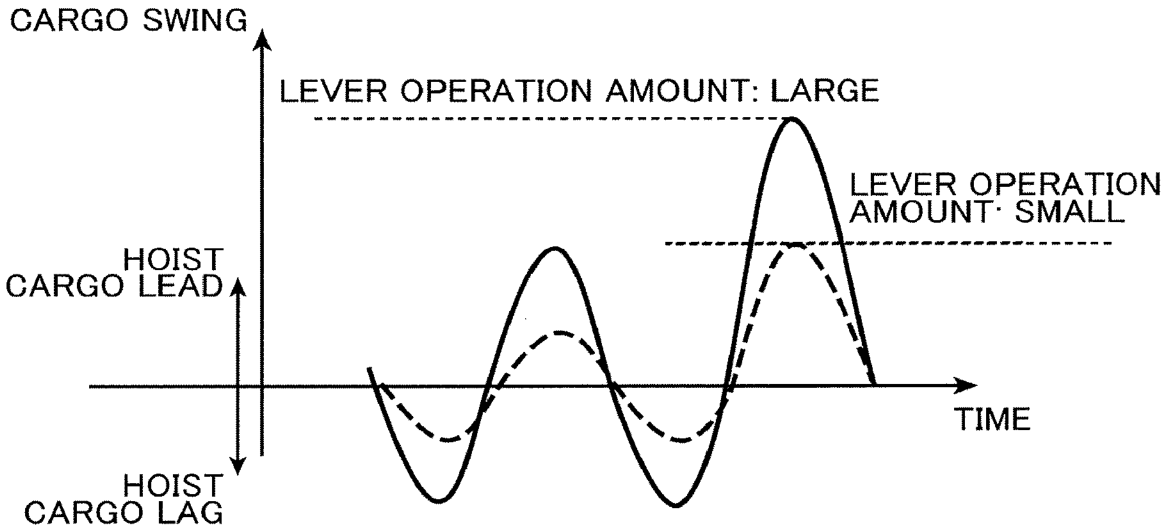
FIG. 6 is a graph showing the change of a cargo swing amount of a hoist cargo when the crane performs the slewing operation.
Figure 7:
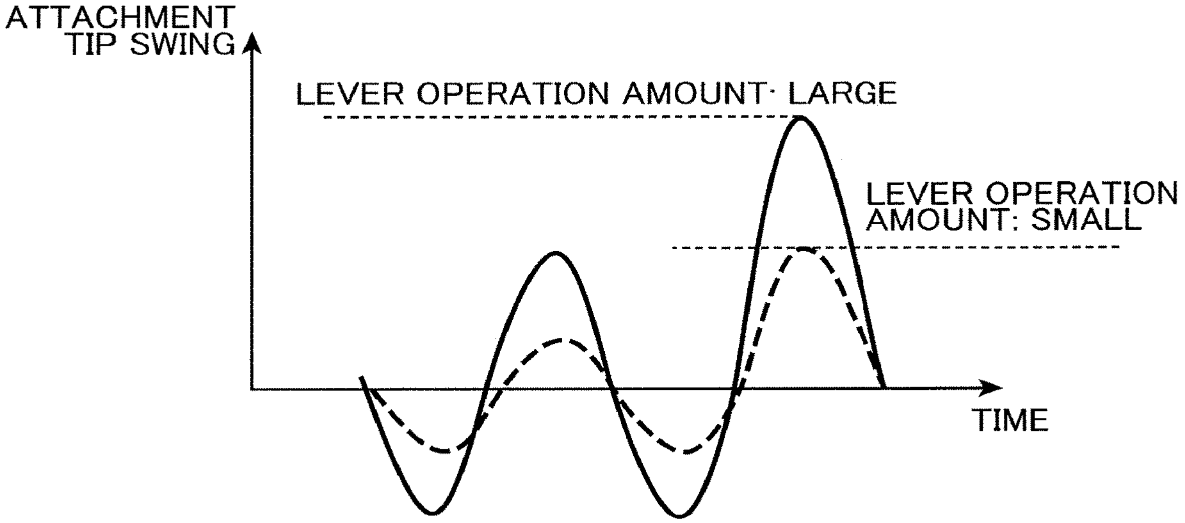
FIG. 7 is a graph showing the change of a swing amount of an attachment tip when the crane performs the slewing operation.

FIG. 4 is a graph showing the change of the operation amount received by the operation lever 81A when the crane 10 performs the slewing operation. FIG. 5 is a graph showing the change of the slewing angular velocity of the upper slewing body 12 when the crane 10 performs the slewing operation. FIG. 6 is a graph showing the change of the cargo swing amount of the hoist cargo when the crane 10 performs the slewing operation. FIG. 7 is a graph showing the change of the swing amount of the attachment tip when the crane 10 performs the slewing operation.

In a case where the upper slewing body 12 slews with the hoist cargo connected to the main winding rope 50 (main hook 57) of the crane 10, when the worker operates the operation lever 81A as shown in FIG. 4, the slewing drive unit 7S slews the upper slewing body 12 according to the operation amount, thereby changing the slewing angular velocity of the upper slewing body 12 as shown in FIG. 5. As the operation amount of the worker operating the operation lever 81A increases, the slewing angular velocity of the upper slewing body 12 increases (FIG. 5).

In such a slewing operation of the upper slewing body 12, a large cargo swing may occur depending on how the worker operates the operation lever. For example, when the upper slewing body 12 starts slewing at the time of starting the slewing operation, since the hoist cargo has inertia, the hoist cargo starts slewing with a lag behind the upper slewing body 12. After that, the hoist cargo moves so as to overtake the upper slewing body 12 due to the pendular movement of the hoist cargo. As a result, as shown in FIG. 6, the movement of the hoist cargo repeating lead, lag, and lead with respect to the upper slewing body 12 (cargo swing) is generated. At this time, if the worker decelerates the upper slewing body 12 at the timing when the hoist cargo is ahead of the upper slewing body 12, the hoist cargo tries to further go ahead of the upper slewing body 12 because of the inertial force of the hoist cargo, causing a large cargo swing (peak portion on the right end of FIG. 6). That is, if the phase of cargo swing during acceleration of the slewing operation (relative movement direction of the hoist cargo with respect to the upper slewing body 12) is the same as the phase of cargo swing during deceleration, the amplitude of the cargo swing overlaps, leading to an increase in the amplitude of the cargo swing.

If such cargo swing amplification occurs, the transverse load acts on the attachment 10S as well, and therefore similar swing also occurs in the distal end of the attachment 10S (FIG. 7), and stress due to this swing also occurs. As the load of the hoist cargo increases (heavy load), the transverse load acting on the attachment 10S increases, and therefore the swing of the attachment 10S also increases. The stress acting on the attachment 10S is also large when the load is heavy. Even when the upper slewing body 12 slews with the same slewing angular velocity, if the attachment 10S is long, the peripheral speed of the distal end increases, and thus the above-described phenomenon becomes more remarkable. Such a swing, transverse load, stress, and the like can cause damage or breakage to some part of the attachment 10S.

<About Limit Value Map>

Figure 8:
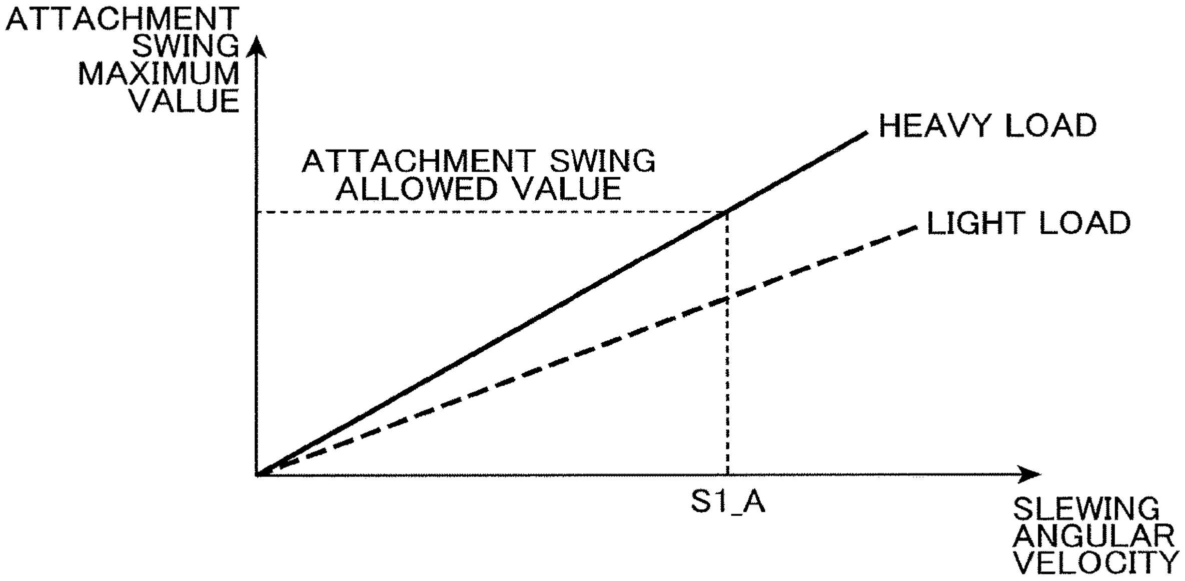
FIG. 8 is a graph showing the relationship between the slewing angular velocity of the upper slewing body and a maximum swing value of the attachment.
Figure 9:
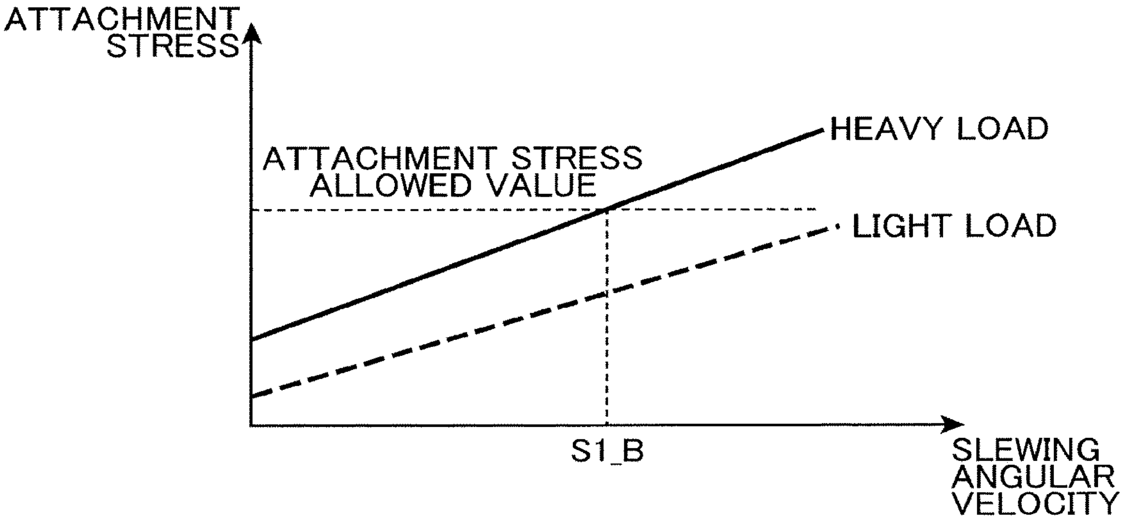
FIG. 9 is a graph showing the relationship between the slewing angular velocity of the upper slewing body and stress the attachment receives.
Figure 10:
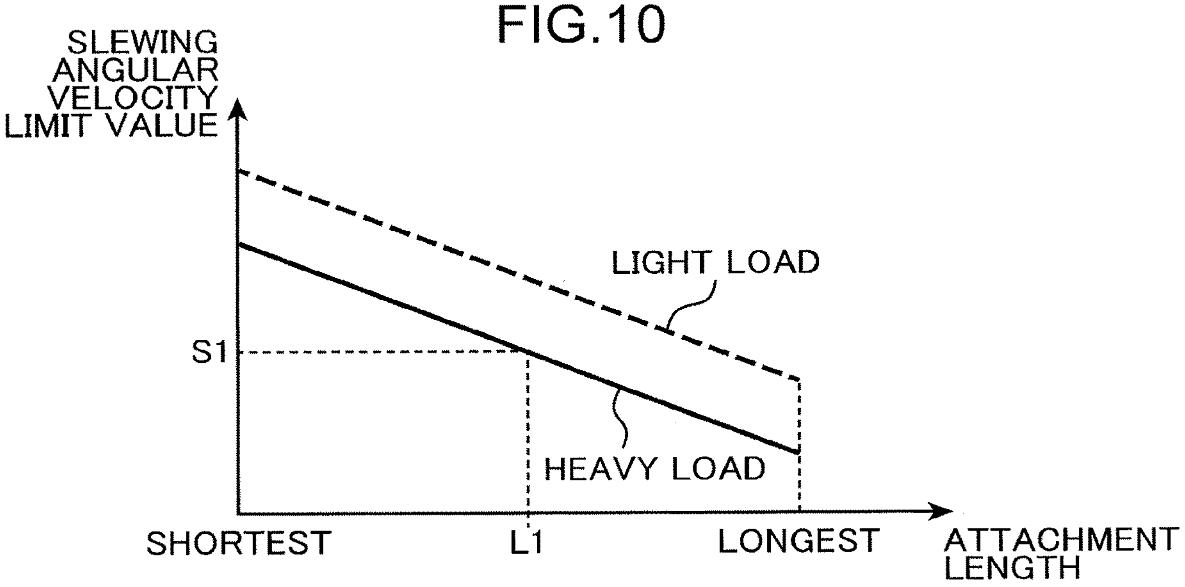
FIG. 10 is a graph showing the relationship between a slewing angular velocity limit value set in the slewing control device and an attachment length according to the first embodiment of the present invention.

FIG. 8 is a graph showing the relationship between the slewing angular velocity of the upper slewing body 12 and the maximum swing value of the attachment 10S. FIG. 9 is a graph showing the relationship between the slewing angular velocity of the upper slewing body 12 and stress the attachment 10S receives. FIG. 10 is a graph showing the relationship between the slewing angular velocity limit value set in the slewing control device 8S and the attachment length according to the present embodiment (limit value map).

In the slewing operation as described above, as shown in FIGS. 8 and 9, as the slewing angular velocity of the upper slewing body 12 increases, the swing of the attachment 10S and the stress received by the attachment 10S tend to increase. Therefore, in the present embodiment, the allowed value of the swing of the attachment 10S for safely operating the crane 10 is set in advance, and as shown in FIG. 8, the slewing angular velocity for satisfying the allowed value is set to be S1_A or less in consideration of the heavy load. Similarly, the allowed value of the stress for not breaking the attachment 10S is set in advance, and the slewing angular velocity for satisfying the allowed value is set to be S1_B or less in consideration of the heavy load. The smaller slewing angular velocity of S1_A and S1_B described above is set as the slewing angular velocity limit value S1 and is housed in the storage unit 803. This slewing angular velocity limit value S1 is preferably set according to the attachment information on the attachment 10S (specification, length). In the present embodiment, as shown in FIG. 10, the limit value map of the slewing angular velocity limit value S1 for the length of the attachment 10S is housed in the storage unit 803. Note that the limit value map is created by evaluating the cargo swing amount, swing amount of the attachment 10S, stress, and the like through advance offline analysis and experiments.

<About Slewing Operation of Upper Slewing Body 12>

Figure 11:
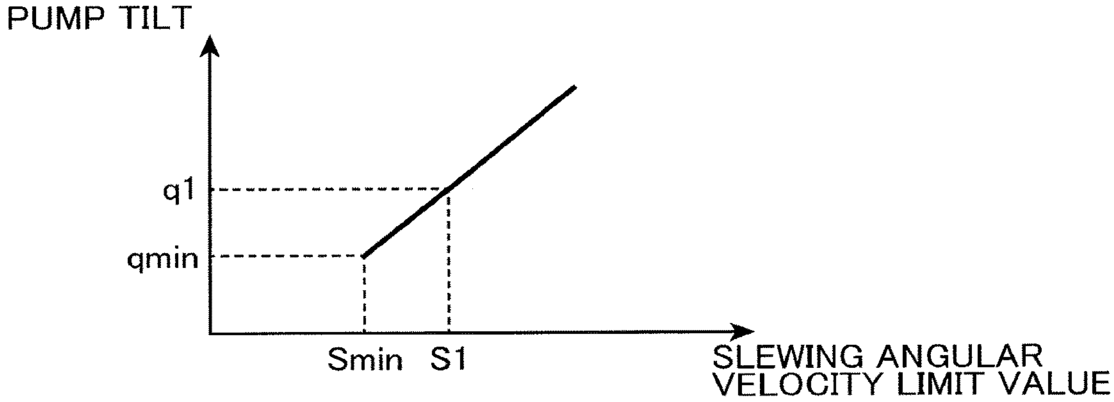
FIG. 11 is a graph showing the relationship between the slewing angular velocity limit value set in the slewing control device and a pump tilt according to the first embodiment of the present invention.
Figure 12:
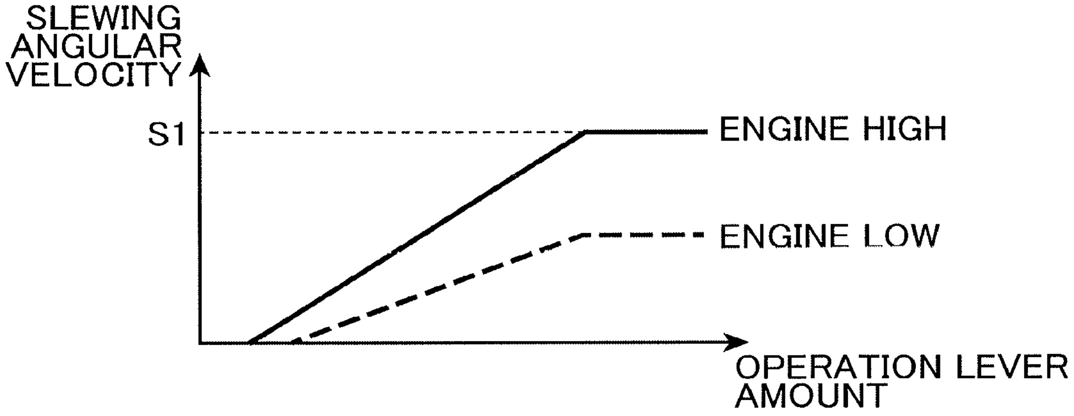
FIG. 12 is a graph showing the relationship between the operation amount of the operation lever and the slewing angular velocity of the upper slewing body in the crane including the slewing control device according to the first embodiment of the present invention.
Figure 13:
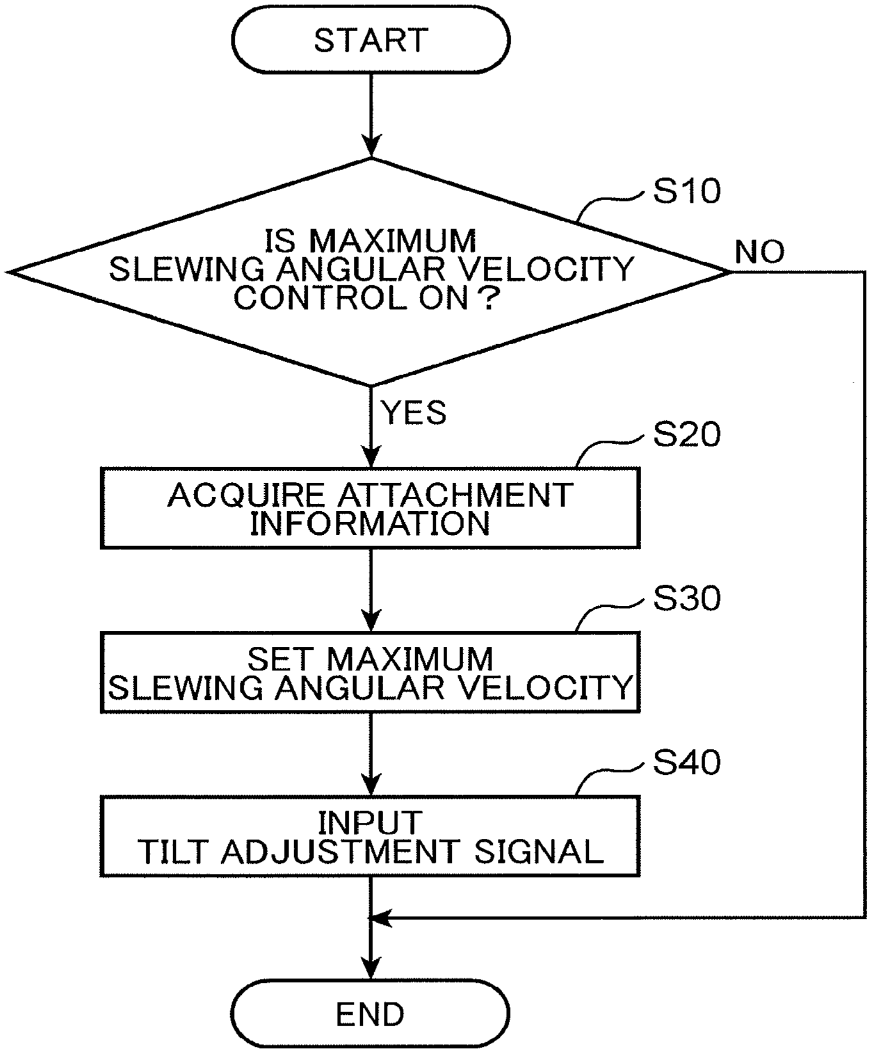
FIG. 13 is a flowchart of the slewing control of the crane performed by the slewing control device according to the first embodiment of the present invention.

FIG. 11 is a graph showing the relationship between the slewing angular velocity limit value set by the slewing control device 8S and the tilt of the hydraulic pump 71 according to the present embodiment. FIG. 12 is a graph showing the relationship between the operation amount of the operation lever 81A and the slewing angular velocity of the upper slewing body 12 in the crane 10 including the slewing control device 8S according to the present embodiment. FIG. 13 is a flowchart of the slewing control of the crane 10 performed by the slewing control device 8S according to the present embodiment. The slewing control of the upper slewing body 12 using the limit value map as described above will be described in detail below.

With reference to FIG. 13, when the worker operates the operation lever 81A regarding the slewing operation and a signal according to the operation is input from the remote control unit 81B to the control unit 80, the angular velocity setting unit 801 determines whether an execution switch of maximum slewing angular velocity control is turned on (step S10). Here, when the execution switch is turned on (YES in step S10), the angular velocity setting unit 801 acquires the attachment information from the storage unit 803 (step S20). In the present embodiment, as described above, the length information on the attachment 10S is acquired. Note that the length of the attachment 10S is the sum of the length of the boom 16 and the length of the jib 18.

Next, based on the length of the attachment 10S acquired above, the angular velocity setting unit 801 sets the slewing angular velocity limit value S1 (maximum slewing angular velocity) with reference to the limit value map (FIG. 10) stored in the storage unit 803 (step S30).

Next, based on the slewing angular velocity limit value S1 set above, the slewing control unit 802 performs the slewing control of the upper slewing body 12 while limiting the slewing angular velocity of the upper slewing body 12 (step S40). Specifically, by controlling the tilt of the hydraulic pump 71 and limiting the maximum flow rate of the hydraulic oil supplied from the hydraulic pump 71 through the control valve 73 to the slewing motor 72, the slewing control unit 802 limits the maximum slewing angular velocity (slewing angular velocity limit value S1) of the upper slewing body 12. The details will be described below.

Assuming that the worker operates the operation lever 81A at the maximum operation amount and all the flow rate of the hydraulic oil discharged from the hydraulic pump 71 is supplied to the slewing motor 72 via the control valve 73, the tilt qp of the hydraulic pump 71 and the slewing angular velocity S of the upper slewing body 12 have the relationship of Formula 1 below.

$$qp \times \omega\_eng \times Npump = qm \times S \times Ngear \qquad \text{(Formula 1)}$$

Note that ω_eng is the number of engine revolutions, Npump is the speed reduction ratio of the hydraulic pump 71, qm is the motor capacity of the slewing motor 72, and Ngear is the slewing reduction ratio from the slewing motor 72 to the upper slewing body 12. Therefore, to limit the slewing angular velocity S of the upper slewing body 12 to the slewing angular velocity limit value S1, the tilt q1 of the hydraulic pump 71 (FIG. 11) can be set so as to satisfy the following Formula 2.

$$q1 = qm \times S1 \times Ngear/(\omega\_eng\_\mathrm{Hi} \times Npump) \qquad \text{(Formula 2)}$$

Note that ω_eng_Hi is the number of engine revolutions (in engine HIGH idle mode).

In this way, when the tilt of the hydraulic pump 71 is set, as shown in FIG. 12, in a case where the engine 70 is in the engine HIGH idle mode, even if the worker sets the operation amount of the operation lever 81A to maximum (full lever), the slewing angular velocity of the upper slewing body 12 does not exceed the slewing angular velocity limit value S1. Therefore, the swing amount of the attachment 10S during the slewing operation and the stress acting on the attachment 10S can be suppressed to equal to or less than the allowed value, making it possible to perform a safe slewing operation. Note that with reference to the detection value of the slewing angular velocity detection unit 76, the slewing control unit 802 can confirm that the slewing angular velocity of the upper slewing body 12 is maintained equal to or less than the slewing angular velocity limit value S1.

Note that in step S10, when the execution switch of the maximum slewing angular velocity control is not turned on (NO in step S10), normal slewing control (control that does not limit the maximum slewing angular velocity) is performed without performing the maximum slewing angular velocity control.

In the present embodiment, as shown in FIG. 10, the description has been given in an aspect in which the slewing angular velocity limit value S1 is set with the length of the attachment 10S as the attachment information. However, even if the length of the attachment 10S (boom length+jib length) is the same, if there is a plurality of combinations, such as if the boom 16 is relatively long and the jib 18 is short, or if the boom 16 is relatively short and the jib 18 is long, the description may be given in an aspect in which a map of the slewing angular velocity limit value is prepared according to each combination and the appropriate slewing angular velocity limit value S1 is set. In this case as well, by preparing the limit value map as described above corresponding to the combination of the severest conditions of deformation of the attachment 10S and stress acting on the attachment 10S, and by controlling the slewing angular velocity of the upper slewing body 12, the safer slewing operation is possible.

In the present embodiment, as shown in FIGS. 8, 9, and 10, regarding the load of the hoist cargo, the description has been given in an aspect in which the slewing angular velocity limit value S1 is set based on the heavy load condition set in advance. However, the load of the hoist cargo for the heavy load condition may be an arbitrary load value input from the input unit 82 by the worker at the work site of the crane 10, and may be an upper limit value of the hoist cargo load (rated load) set in advance in the crane 10. In the former case, the graph (or table) of FIG. 10 may be housed in the storage unit 803 according to the magnitude of the hoist cargo load (load factor), and the slewing angular velocity limit value S1 is only required to be set according to the hoist cargo load.

The angular velocity setting unit 801 may set the slewing angular velocity limit value S1 of the upper slewing body 12 based on the slewing operation information, in addition to the attachment information (length of attachment 10S) acquired by the attachment information acquisition unit 800A. In this case, when the slewing operation information acquisition unit 800B (FIG. 3) acquires the hoist cargo load from the load detection unit 67 as the slewing operation information, the angular velocity setting unit 801 is required at least to set the slewing angular velocity limit value S1 corresponding to the length of the attachment 10S after selecting the graph corresponding to the hoist cargo load from a plurality of graphs for "heavy load" and "light load" in the graph of FIG. 10. Note that the plurality of graphs shown in FIG. 10 may include three or more graphs corresponding to the magnitude of the hoist cargo load. A predetermined formula in which the hoist cargo load and the length of the attachment 10S are variables may be housed in the storage unit 803 in advance, and the angular velocity setting unit 801 may set the slewing angular velocity limit value S1 based on the formula.

As described above, in the present embodiment, the attachment information acquisition unit 800A acquires the attachment information. The attachment information is information peculiar to the attachment 10S for setting the maximum slewing angular velocity based on the transverse load that is a load along the slewing direction of the upper slewing body 12 and acting on the attachment 10S associated with the slewing operation of the upper slewing body 12. The angular velocity setting unit 801 sets the maximum slewing angular velocity (slewing angular velocity limit value S1) that is the maximum value of the slewing angular velocity of the upper slewing body 12 that is allowed in the slewing operation of the upper slewing body 12 based on at least the attachment information acquired by the attachment information acquisition unit 800A. Furthermore, the slewing control unit 802 receives the slewing command signal output from the operation unit 81 and controls the slewing drive unit 7S such that the upper slewing body 12 slews with respect to the lower travelling body 14 in response to the slewing command signal. At this time, the slewing control unit 802 controls the slewing drive unit 7S such that the slewing angular velocity of the upper slewing body 12 does not exceed the maximum slewing angular velocity that is set by the angular velocity setting unit 801.

With such a configuration, since the angular velocity setting unit 801 sets the maximum slewing angular velocity in the slewing operation of the upper slewing body 12 according to the attachment information, it is possible to efficiently inhibit the attachment 10S from being damaged or broken due to a large transverse load applied to the attachment 10S based on the slewing operation of the worker. In particular, the worker does not have to voluntarily set the slewing angular velocity of the upper slewing body 12 excessively low due to excessive consideration of the rigidity of the attached attachment 10S, allowing the worker to concentrate on the behavior of the hoist cargo.

In particular, the attachment information includes the length of the attachment 10S from the proximal end to the distal end of the attachment 10S. The angular velocity setting unit 801 sets the maximum slewing angular velocity to a first slewing angular velocity when the length of the attachment 10S is a first length, and sets the maximum slewing angular velocity to a second slewing angular velocity smaller than the first slewing angular velocity when the length of the attachment 10S is a second length greater than the first length (see graph of FIG. 10). That is, the angular velocity setting unit 801 sets the maximum slewing angular velocity such that the maximum slewing angular velocity decreases as the length of the attachment 10S increases.

With such a configuration, since the angular velocity setting unit 801 sets the maximum slewing angular velocity of the upper slewing body 12 relatively small when the relatively long attachment 10S is attached to the upper slewing body 12, it is possible to inhibit the attachment 10S from being damaged or broken due to a large transverse load applied to the attachment 10S. In particular, when the attachment 10S with low strength such as a long attachment is attached to the upper slewing body 12, even if the worker suddenly inputs a large slewing operation from the operation lever 81A, since the angular velocity setting unit 801 limits the maximum slewing angular velocity, it is possible to reduce the deformation of the attachment 10S due to the cargo shaking equal to or less than the allowed value, and it is possible to reduce the risk of breakage to the attachment 10S as described above and perform safe operations.

In the present embodiment, the angular velocity setting unit 801 sets the maximum slewing angular velocity based on the attachment information acquired by the attachment information acquisition unit 800A and the slewing operation information acquired by the slewing operation information acquisition unit 800B.

With such a configuration, since the angular velocity setting unit 801 sets the maximum slewing angular velocity based on the slewing information in the slewing operation of the crane 10, in addition to the attachment information peculiar to the attachment, it is possible to control the occurrence of the large transverse load in the slewing operation and further inhibit the attachment 10S from being damaged or broken.

In the present embodiment, the slewing operation information includes information corresponding to the hoist cargo load, which is the load of the hoist cargo connected to the main winding rope 50. The angular velocity setting unit 801 sets the maximum slewing angular velocity based on the attachment information acquired by the attachment information acquisition unit 800A and the hoist cargo load acquired by the slewing operation information acquisition unit 800B.

With such a configuration, since the angular velocity setting unit 801 sets the maximum slewing angular velocity based on the hoist cargo load that can have a significant impact on the transverse load acting on the attachment 10S in addition to the attachment information, it is possible to securely inhibit the large transverse load from acing on the attachment 10S.

In particular, in the same attachment information (attachment length L1 of FIG. 10), the angular velocity setting unit 801 sets the maximum slewing angular velocity to a third slewing angular velocity when the hoist cargo load is a first load (light load), and sets the maximum slewing angular velocity to a fourth slewing angular velocity smaller than the third slewing angular velocity when the hoist cargo load is a second load (heavy load) greater than the first load (see graph of FIG. 10). That is, the angular velocity setting unit 801 sets the maximum slewing angular velocity such that the maximum slewing angular velocity decreases as the hoist cargo load increases.

With such a configuration, when the hoist cargo with the relatively large load is connected to the attachment 10S, the angular velocity setting unit 801 sets the maximum slewing angular velocity of the upper slewing body 12 relatively small, and therefore it is possible to securely inhibit the attachment 10S from being damaged or broken due to a large transverse load applied to the attachment 10S.

Note that, as described above, the slewing operation information acquired by the slewing operation information acquisition unit 800B may include preset information on the maximum hoist cargo load, which is the maximum load of the hoist cargo connected to the main winding rope 50. In this case, the angular velocity setting unit 801 preferably sets the maximum slewing angular velocity based on the attachment information acquired by the attachment information acquisition unit 800A and the maximum hoist cargo load. The maximum hoist cargo load may be set by the worker at the work site, or may be a rated load set in advance for the crane 10. In the former case, the worker only needs to connect the hoist cargo equal to or less than the set maximum hoist cargo load to the main winding rope 50. In the latter case, the worker only needs to connect the hoist cargo equal to or less than the preset rated load to the main winding rope 50.

With such a configuration, since the information for setting the maximum slewing angular velocity has been set in advance before the slewing operation, there is no need to detect and reflect the hoist cargo load by the load detection unit 67 when the upper slewing body 12 performs the slewing operation, and the maximum slewing angular velocity can be simply set.

Note that the angular velocity setting unit 801 may set the maximum slewing angular velocity at the time of starting the slewing operation of the upper slewing body 12, and may maintain (not change) the maximum slewing angular velocity during the slewing operation of the upper slewing body 12.

With such a configuration, the maximum slewing angular velocity does not change during the slewing operation, making it possible to prevent the operability of the worker from being decreased due to the frequent occurrence of sudden change in the angular velocity of the upper slewing body 12.

In the present embodiment, the slewing control unit 802 limits the discharge amount of the hydraulic oil to be discharged from the hydraulic pump 71 such that the slewing angular velocity of the upper slewing body 12 does not exceed the maximum slewing angular velocity by adjusting the tilt of the hydraulic pump 71, making it possible to securely limit the slewing angular velocity of the upper slewing body 12.

Meanwhile, the angular velocity setting unit 801 may update the maximum slewing angular velocity at predetermined intervals during the slewing operation of the upper slewing body 12, and the slewing control unit 802 may control the slewing drive unit 7S such that the slewing angular velocity of the upper slewing body 12 does not exceed the maximum slewing angular velocity updated by the angular velocity setting unit 801.

With such a configuration, since the maximum slewing angular velocity is updated according to the change in the slewing information during the slewing operation, the workability can be improved while ensuring the safety. Note that the predetermined interval may be a predetermined time interval or a predetermined slewing angle interval.

Second Embodiment

Figure 14:
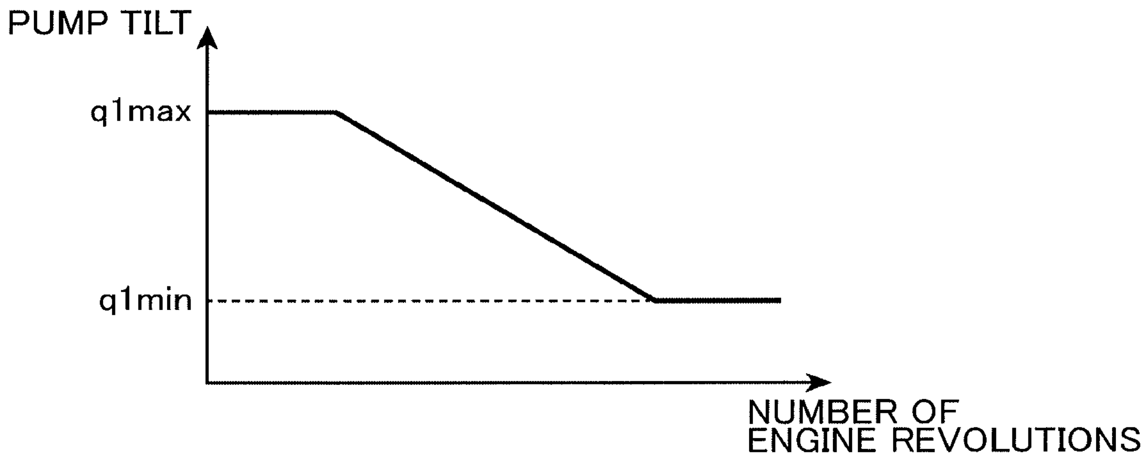
FIG. 14 is a graph showing the relationship between the number of engine revolutions and pump tilt in slewing control performed by a slewing control device according to a second embodiment of the present invention.
Figure 15:
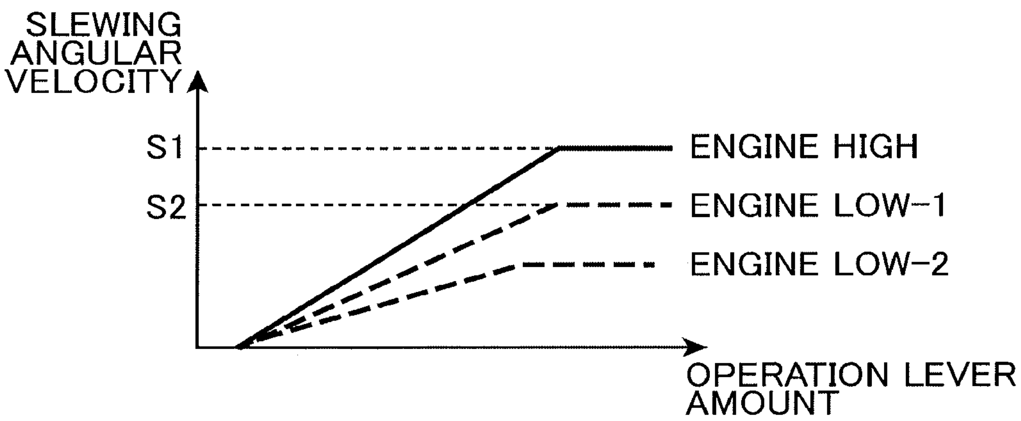
FIG. 15 is a graph showing the relationship between an operation amount of an operation lever and a slewing angular velocity of an upper slewing body in the slewing control performed by the slewing control device according to the second embodiment of the present invention.

Next, a crane 10 including a slewing control device 8S according to a second embodiment of the present invention will be described. Note that in the present embodiment, the description will focus on the difference from the previous first embodiment, and the description of common points will be omitted (the same applies to subsequent embodiments). FIG. 14 is a graph showing the relationship between the number of engine revolutions and the tilt of a hydraulic pump 71 in slewing control performed by the slewing control device 8S according to the present embodiment. FIG. 15 is a graph showing the relationship between the operation amount of an operation lever 81A and a slewing angular velocity of an upper slewing body 12 in the slewing control performed by the slewing control device 8S according to the present embodiment.

In the previous first embodiment, the description has been given in an aspect in which the tilt of the hydraulic pump 71 is set to q1, as shown in FIG. 11, based on the maximum slewing angular velocity (slewing angular velocity limit value S1) set by the angular velocity setting unit 801. In the present embodiment, as shown in FIG. 14, the tilt of the hydraulic pump 71 (pump tilt) is set according to the number of revolutions of an engine 70.

In FIG. 14, q1 min and q1max are set by Formulas 3 and 4 below, respectively.

$$q1\min = S1 \times Ngear \times qm/\omega\_eng\_\mathrm{Hi} \quad \text{(Formula 3)}$$

$$q1\max = S1 \times Ngear \times qm/\omega\_eng\_\mathrm{Low} \quad \text{(Formula 4)}$$

Note that ω_eng_Low is the number of engine revolutions (in engine low idle mode) and can be acquired by a detection value of an engine revolutions detection unit 75.

A slewing control unit 802 adjusts the tilt of the hydraulic pump 71 between q1 min and q1max according to the number of revolutions of the engine 70 as shown in FIG. 14, thereby allowing the slewing angular velocity of the upper slewing body 12 to be set as shown in FIG. 15. That is, in the engine HIGH idle mode where the slewing angular velocity of the upper slewing body 12 is likely to increase, by setting the tilt of the hydraulic pump 71 to q1 min in FIG. 14, the slewing angular velocity of the upper slewing body 12 can be kept equal to or less than the slewing angular velocity limit value S1. Meanwhile, in the present embodiment, in the engine LOW idle mode, by setting the tilt of the hydraulic pump 71 to q1max in FIG. 14, setting the discharge amount of the hydraulic oil discharged from the hydraulic pump 71 to be excessively small is inhibited more than the control by the slewing control device 8S according to the previous first embodiment (engine LOW-2 in FIG. 15). As a result, as shown in engine LOW-1 of FIG. 15, the slewing angular velocity of the upper slewing body 12 is allowed to be greater than the slewing angular velocity of the first embodiment (slewing angular velocity S2, where S1>S2), and the change in the slewing angular velocity of the upper slewing body 12 with respect to the number of revolutions of the engine 70 is set moderately, making it possible to improve the operability of the slewing operation by a worker.

Third Embodiment

Figure 16:
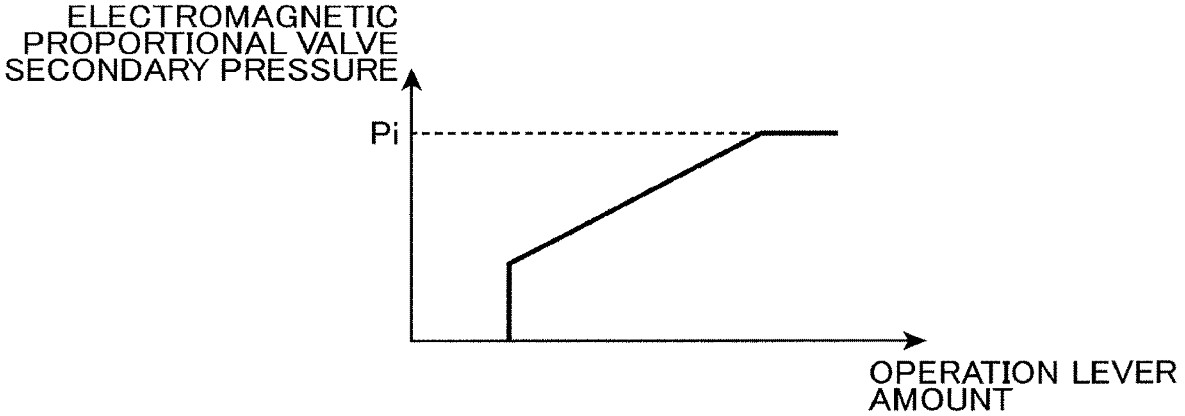
FIG. 16 is a graph showing the relationship between an operation amount of an operation lever and secondary pressure of electromagnetic proportional valves in slewing control performed by a slewing control device according to a third embodiment of the present invention.
Figure 17:
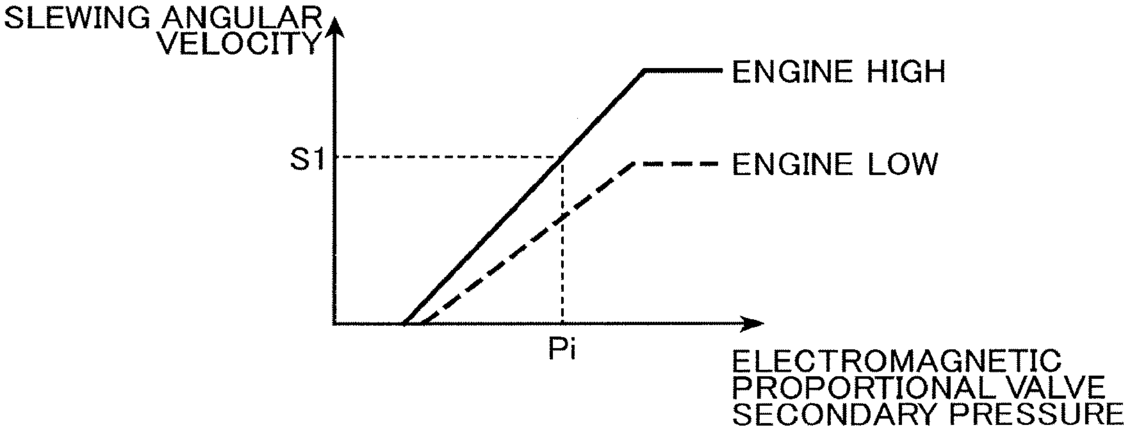
FIG. 17 is a graph showing the relationship between the secondary pressure of the electromagnetic proportional valves and a slewing angular velocity of an upper slewing body in the slewing control performed by the slewing control device according to the third embodiment of the present invention.
Figure 18:
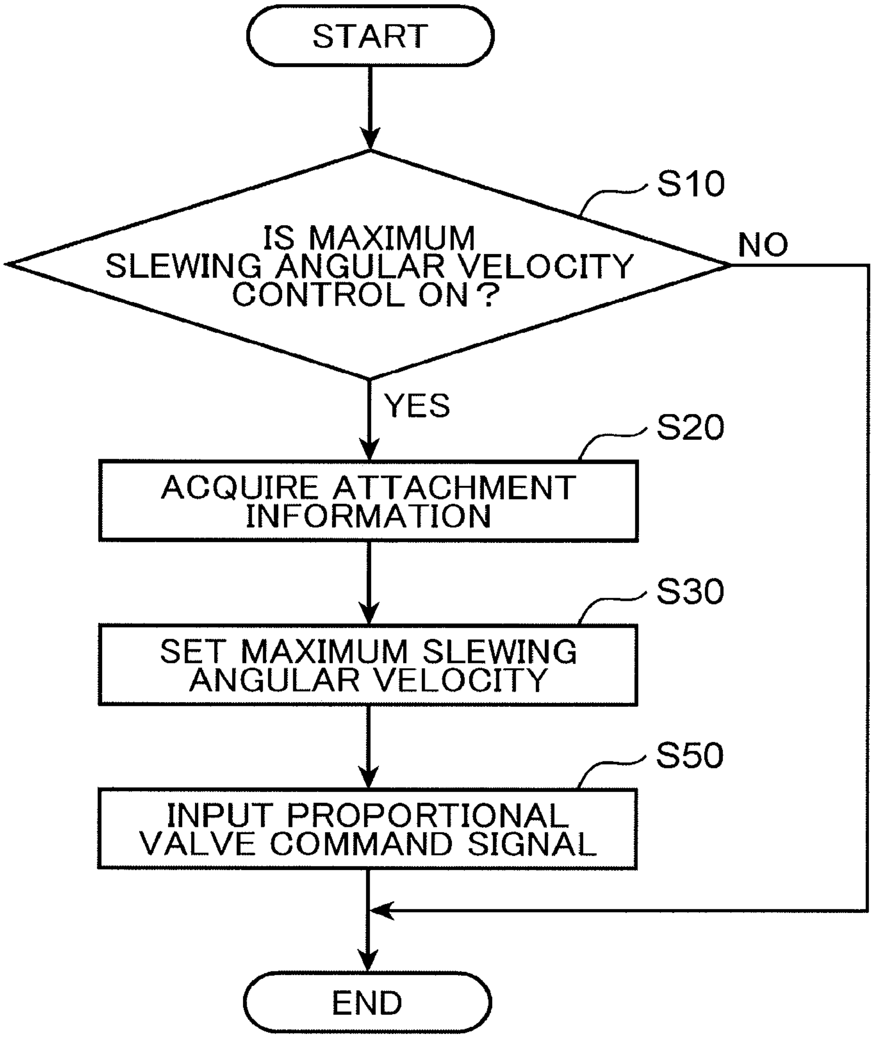
FIG. 18 is a flowchart of the slewing control of a crane performed by the slewing control device according to the third embodiment of the present invention.

Next, a crane 10 including a slewing control device 8S according to a third embodiment of the present invention will be described. FIG. 16 is a graph showing the relationship between the operation amount of an operation lever 81A and secondary pressure of electromagnetic proportional valves (first electromagnetic proportional valve 77, second electromagnetic proportional valve 78) in slewing control performed by the slewing control device 8S according to the present embodiment. FIG. 17 is a graph showing the relationship between the secondary pressure of the electromagnetic proportional valves and a slewing angular velocity of an upper slewing body 12 in the slewing control performed by the slewing control device 8S according to the present embodiment. FIG. 18 is a flowchart of the slewing control of the crane 10 performed by the slewing control device 8S according to the present embodiment.

In the previous first embodiment, the description has been given in an aspect in which the slewing control unit 802 adjusts the tilt of the hydraulic pump 71 to limit the discharge amount (pump capacity) of the hydraulic oil discharged from the hydraulic pump 71, thereby limiting the slewing angular velocity of the upper slewing body 12. Meanwhile, in the present embodiment, the secondary pressure of the first electromagnetic proportional valve 77 and the second electromagnetic proportional valve 78 shown in FIG. 2 is adjusted, and a control valve 73 adjusts the flow rate of the hydraulic oil, thereby limiting the slewing angular velocity of the upper slewing body 12.

That is, steps S10, S20, and S30 are sequentially executed in the present embodiment as in the previous first embodiment (FIG. 18). Meanwhile, when an angular velocity setting unit 801 sets the maximum slewing angular velocity (slewing angular velocity limit value S1) in step S30, the slowing control unit 802 inputs a proportional valve command signal to the first electromagnetic proportional valve 77 or the second electromagnetic proportional valve 78 in step S50. Specifically, the slewing control unit 802 limits the secondary pressure of each proportional valve to Pi to correspond to the slewing angular velocity limit value S1 (FIG. 16). Since there is a relationship as shown in FIG. 17 between the secondary pressure of each of the first electromagnetic proportional valve 77 and the second electromagnetic proportional valve 78, and the slewing angular velocity of the upper slewing body 12, by setting the maximum value of the secondary pressure of the electromagnetic proportional valve to Pi, the maximum value of the slewing angular velocity of the upper slewing body 12 can be limited to S1, and the same effect as in the first embodiment can be obtained.

That is, in the present embodiment, the slewing control unit 802 inputs a compulsory command signal (proportional valve command signal) corresponding to the maximum slewing angular velocity set by the angular velocity setting unit 801 to the first electromagnetic proportional valve 77 and the second electromagnetic proportional valve 78 of a flow rate adjustment mechanism 7T, thereby limiting the flow rate of the hydraulic oil supplied from the control valve 73 of the flow rate adjustment mechanism 7T to a slewing motor 72 such that the slewing angular velocity of the upper slewing body 12 does not exceed the maximum slewing angular velocity (slewing angular velocity limit value S1) regardless of the magnitude of the slewing command signal output from the operation unit 81. As a result, the slewing angular velocity of the upper slewing body 12 can be securely limited.

Figure 19:
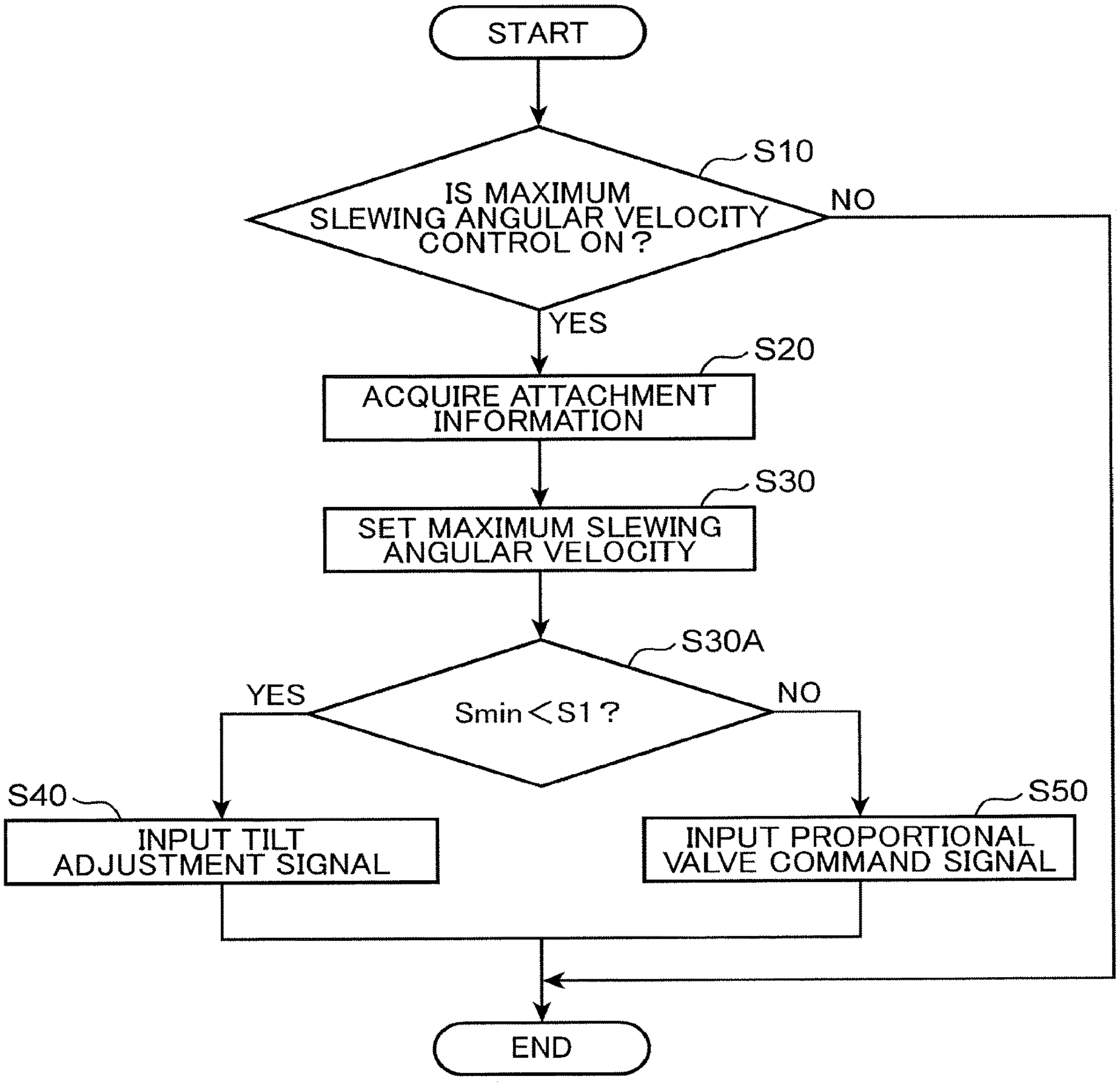
FIG. 19 is a flowchart of slewing control of a crane performed by a slewing control device according to a modification of the third embodiment of the present invention.

Note that the first embodiment and the third embodiment can be combined with each other to perform suitable control. A modification according to the present embodiment will be described below. FIG. 19 is a flowchart of slewing control of the crane performed by the slewing control device 8S according to the modification of the present embodiment.

With reference to FIG. 11, because of the structure, a hydraulic pump 71 discharges a minimum capacity of hydraulic oil qmin (FIG. 11) regardless of the magnitude of a tilt command signal (even if the tilt is set to zero). In other words, the flow rate of the hydraulic oil discharged from the hydraulic pump 71 generally does not become zero. In this case, the slewing angular velocity Smin of the upper slewing body 12 corresponding to the above minimum capacity qmin is calculated by Formula 5 below.

$$Smin = qmin \times \omega\_eng \times Npump/(qm \times Ngear) \qquad \text{(Formula 5)}$$

That is, when the maximum slewing angular velocity (slewing angular velocity limit value) set by the angular velocity setting unit 801 is smaller than the slewing angular velocity Smin, depending on the discharge performance of the hydraulic pump 71, it becomes difficult to sufficiently limit the slewing angular velocity of the upper slewing body 12. To solve such a problem, in the present embodiment, as shown in FIG. 19, in step S30A, the slewing control unit 802 compares the magnitude relationship between the slewing angular velocity limit value S1 and the slewing angular velocity Smin corresponding to the minimum capacity qmin. Then, when Smin<S1 (YES in step S30A), the slewing control unit 802 limits the slewing angular velocity of the upper slewing body 12 based on the tilt of the hydraulic pump 71 as in the first embodiment (step S40). Meanwhile, when Smin≥S1 (NO in step S30A), as in the third embodiment, the slewing control unit 802 limits the slewing angular velocity of the upper slewing body 12 based on secondary pressure of the first electromagnetic proportional valve 77 and the second electromagnetic proportional valve 78 (step S40).

As described above, in this modification, when the discharge amount of the hydraulic pump 71 corresponding to the maximum slewing angular velocity that is set by the angular velocity setting unit 801 is greater than the minimum discharge amount (minimum capacity qmin), by inputting the tilt command signal corresponding to the maximum slewing angular velocity into the hydraulic pump 71 (tilt adjustment unit 71S), the slewing control unit 802 limits the discharge amount of the hydraulic oil to be discharged from the hydraulic pump 71 such that the slewing angular velocity of the upper slewing body 12 does not exceed the maximum slewing angular velocity. Meanwhile, when the discharge amount of the hydraulic pump 71 corresponding to the maximum slewing angular velocity set by the angular velocity setting unit 801 is smaller than the minimum discharge amount, by inputting the compulsory command signal corresponding to the maximum slewing angular velocity into the flow rate adjustment mechanism 7T (first electromagnetic proportional valve 77, second electromagnetic proportional valve 78), the slewing control unit 802 limits the flow rate of the hydraulic oil supplied from the flow rate adjustment mechanism 7T to the slewing motor 72 such that the slewing angular velocity of the upper slewing body 12 does not exceed the maximum slewing angular velocity, regardless of the magnitude of the slewing command signal.

Based on such control, from the discharge performance of the hydraulic pump 71, even if the slewing angular velocity of the upper slewing body 12 cannot be sufficiently limited to the maximum slewing angular velocity as required by the angular velocity setting unit 801, the slewing control unit 802 inputs the compulsory command signal into the first electromagnetic proportional valve 77 and the second electromagnetic proportional valve 78 and adjusts the secondary pressure, thereby making it possible to securely limit the slewing angular velocity of the upper slewing body 12. The normal slewing operation can limit the slewing angular velocity of the upper slewing body 12 without adjusting the secondary pressure of the first electromagnetic proportional valve 77 and the second electromagnetic proportional valve 78. Therefore, the relationship between the operation amount of the worker operating the operation lever 81A and the stroke volume of the control valve 73 can be maintained.

In the third embodiment described above, the description has been given in an aspect in which, by adjusting the secondary pressure of the first electromagnetic proportional valve 77 and the second electromagnetic proportional valve 78, the flow rate of the hydraulic oil supplied from the control valve 73 to the slewing motor 72 is adjusted, and the slewing angular velocity of the upper slewing body 12 is limited. However, the slewing angular velocity of the upper slewing body 12 may be limited by the slewing motor 72 including a variable displacement type hydraulic motor in the same way as the hydraulic pump 71, and adjusting the capacity (tilt) of the slewing motor 72.

Fourth Embodiment

Figure 20:
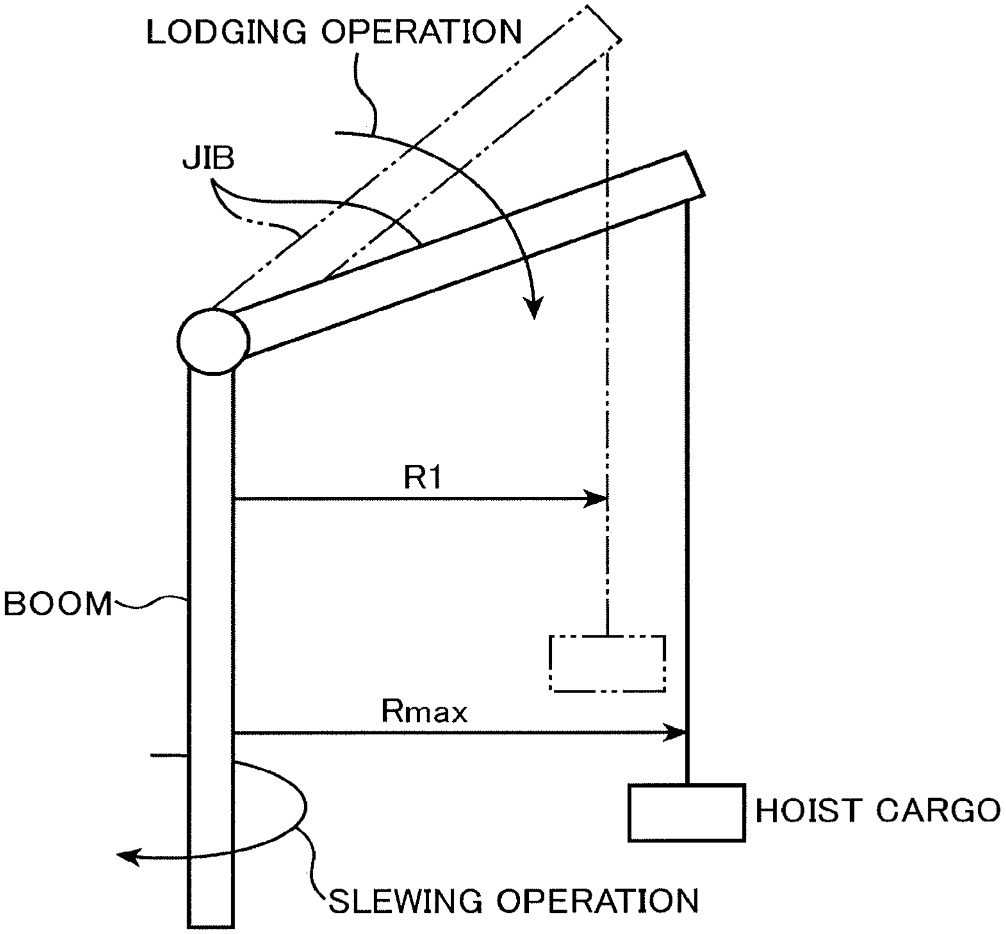
FIG. 20 is a schematic diagram of a boom and a jib of a crane including a slewing control device according to a fourth embodiment of the present invention.
Figure 21:
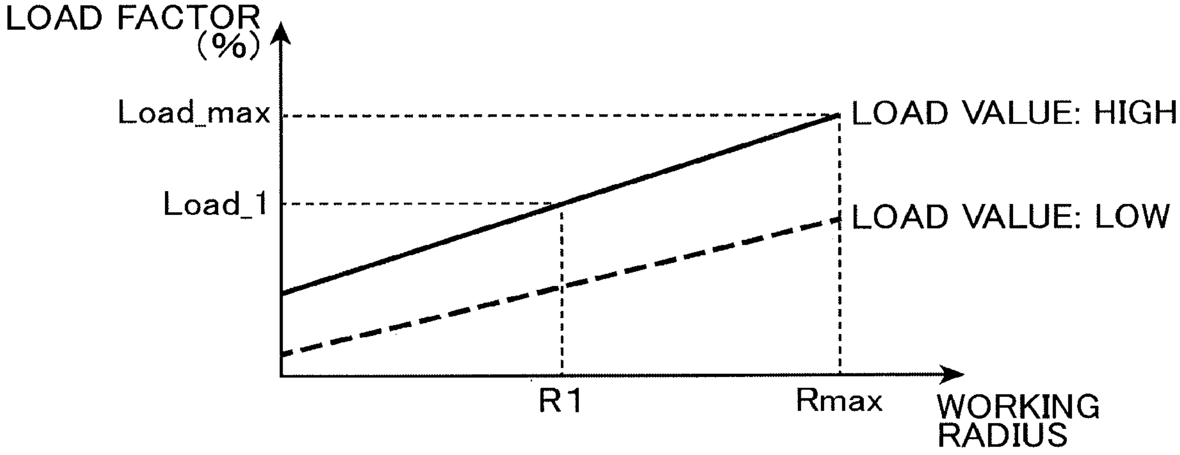
FIG. 21 is a graph showing the relationship between a working radius and a load factor in slewing control performed by the slewing control device according to the fourth embodiment of the present invention.

Next, a crane 10 including a slewing control device 8S according to a fourth embodiment of the present invention will be described. FIG. 20 is a schematic diagram of a boom 16 and a jib 19 of the crane 10 including the slewing control device 8S according to the present embodiment. FIG. 21 is a graph showing the relationship between a working radius and a load factor in slewing control performed by the slewing control device 8S according to the present embodiment.

In the previous first embodiment, the description has been given in an aspect in which the slewing angular velocity of the upper slewing body 12 is limited based on the length of the attachment 10S or based on the length of the attachment 10S and the load of the hoist cargo. In the present embodiment, an angular velocity setting unit 801 limits the slewing angular velocity of the upper slewing body 12 based on the working radius of the attachment 10S.

With reference to FIG. 20, even if the load of the hoist cargo hanging down from the distal end of the attachment 10S (jib 18) is the same, if the working radius R1 changes because the attachment 10S is hoisted (derricking angle changes), the swing of the tip of the attachment 10S and the stress acting on the attachment 10S will change. In particular, when the attachment 10S lodges and the working radius R1 increases, the load on the attachment 10S increases. Therefore, in the present embodiment, a slewing operation information acquisition unit 800B acquires the working radius R1 in addition to the load of the hoist cargo as the slewing operation information, and sets the appropriate slewing angular velocity limit value S1 of the upper slewing body 12.

Specifically, as shown in FIG. 21, a preset load factor is set according to the magnitude of the load of the hoist cargo and the magnitude of the working radius R1. Then, the angular velocity setting unit 801 is required at least to set the slewing angular velocity limit value S1 according to the load factor. For the same load value, as the working radius R1 increases, the load factor increases, and therefore the angular velocity setting unit 801 preferably sets the smaller slewing angular velocity limit value S1.

Note that the angular velocity setting unit 801 can calculate the working radius R1 simply by using trigonometric functions from the derricking angle of the attachment 10S (boom 16, jib 18) detected by a derricking angle detection unit 66 and the length of the attachment 10S that is input or stored in advance.

As described above, in the present embodiment, the slewing operation information acquired by the slewing operation information acquisition unit 800B includes information about the working radius, which is the distance from the proximal end to the distal end of the attachment 10S in plan view. Then, the angular velocity setting unit 801 sets the maximum slewing angular velocity based on the attachment information acquired by an attachment information acquisition unit 800A and the working radius acquired by the slewing operation information acquisition unit 800B.

With such a configuration, since the angular velocity setting unit sets the maximum slewing angular velocity based on the working radius that can have a significant impact on the transverse load acting on the attachment 10S, it is possible to securely inhibit a large transverse load from acting on the attachment 10S.

In particular, in the same attachment information, the angular velocity setting unit 801 preferably sets the maximum slewing angular velocity to one slewing angular velocity (fifth slewing angular velocity) when the working radius R is a first working radius, and sets the maximum slewing angular velocity to another slewing angular velocity (sixth slewing angular velocity) smaller than the one slewing angular velocity when the working radius R is a second working radius that is larger than the first working radius. That is, the angular velocity setting unit 801 may set the maximum slewing angular velocity such that the maximum slewing angular velocity decreases as the working radius R increases.

With such a configuration, since the angular velocity setting unit 801 sets the maximum slewing angular velocity of the upper slewing body 12 relatively small when a relatively large working radius is set for the attachment 10S, it is possible to securely inhibit the attachment 10S from being damaged or broken due to a large transverse load applied to the attachment 10S.

Next, a modification of the present embodiment will be described. It is assumed that during the slewing operation of the upper slewing body 12, the worker simultaneously performs the hoisting operation of the attachment 10S in addition to the slewing operation. For example, when the worker causes the attachment 10S to lodge (to be lowered), the working radius R1 of the attachment 10S increases, and in step with this, the moment acting on the attachment 10S increases, which in turn increases the load factor.

Therefore, when the angular velocity setting unit 801 sets the slewing angular velocity limit value S1 for the load factor as described above, even if the operation amount of an operation lever 81A for slewing by the worker is constant, the slewing angular velocity limit value S1 changes from the change in the load factor based on the lodging operation, ensuring safety. Meanwhile, this may be a slewing operation the worker does not intend, and the operability may deteriorate.

Therefore, when the slewing operation starts, the angular velocity setting unit 801 may calculate the maximum load factor Load_max based on the maximum working radius Rmax (FIG. 20, FIG. 21) that may be operated during subsequent slewing operations and the hoist cargo load (load value) detected in advance, and may set the slewing angular velocity limit value S1 based on this maximum load factor Load_max and the length of the attachment 10S. Note that the maximum working radius Rmax can be set by the known moment limit function (ML) provided by the control unit 80. The moment limit function is a function to limit the working radius to prevent the crane 10 from falling over during work of the crane 10, as described above. The maximum working radius Rmax may be input by the worker from an input unit 82 depending on the work site and stored in the storage unit 803.

By such control, even if the worker performs the lodging operation of the attachment 10S during the slewing operation and the working radius R1 increases, since the slewing angular velocity limit value S1 is set in advance based on the largest working radius Rmax, the worker can perform a safe operation securely, and a change in the slewing angular velocity that does not respond to the operation amount of the operation lever 81A for slewing during the slewing operation is inhibited, and it is possible for the safety and the workability to be compatible in the slewing operation.

Note that if the working radius R1 of the attachment 10S is decreased by the operation of the worker during the slewing operation, the angular velocity setting unit 801 may set the slewing angular velocity limit value S1 of the upper slewing body 12 relatively large.

As described above, in this modification, the slewing operation information acquired by the slewing operation information acquisition unit 800B includes information about the maximum working radius set according to the load of the hoist cargo to prevent the crane 10 from falling over for the working radius of the attachment 10S. Then, the angular velocity setting unit 801 sets the maximum slewing angular velocity based on the attachment information acquired by the attachment information acquisition unit 800A and the maximum working radius acquired by the slewing operation information acquisition unit 800B (working radius Rmax).

With such a configuration, when the upper slewing body 12 performs the slewing operation, the maximum slewing angular velocity can be easily set without the need to detect and reflect the current working radius by using the derricking angle detection unit 66 or the like. Note that the angular velocity setting unit 801 may set the maximum slewing angular velocity in advance before the slewing operation after combining the maximum working radius (working radius Rmax) described above with the maximum hoist cargo load.

As described above, in the slewing control performed by the slewing control device 8S according to the present embodiment or the modification, the angular velocity setting unit 801 may fix the slewing angular velocity limit value S1 of the upper slewing body 12 during the slewing operation or perform update as required.

Note that when the angular velocity setting unit 801 sets the maximum slewing angular velocity to maintain the maximum slewing angular velocity during the slewing operation of the upper slewing body 12, it is possible to prevent the operability of the worker from being decreased by frequent occurrence of sudden angular velocity changes in the upper slewing body 12.

Meanwhile, the angular velocity setting unit 801 may update the maximum slewing angular velocity at predetermined intervals during the slewing operation of the upper slewing body 12. In this case, a slewing control unit 802 is required at least to control the slewing drive unit 7S such that the slewing angular velocity of the upper slewing body 12 does not exceed the maximum slewing angular velocity that is updated by the angular velocity setting unit 801.

With such a configuration, since the maximum slewing angular velocity is updated according to the change in the slewing information during the slewing operation, the workability can be improved while ensuring the safety.

In particular, the slewing operation information acquisition unit 800B acquires information about the working radius that changes with the hoisting operation of the attachment 10S during the slewing operation of the upper slewing body 12. The angular velocity setting unit 801 can update the maximum slewing angular velocity based on the information about the working radius acquired by the slewing operation information acquisition unit 800B.

With such a configuration, even if the working radius changes due to the hoisting operation of the attachment 10S during the slewing operation, the optimal maximum slewing angular velocity can be set. In particular, when the standing movement of the attachment 10S causes the working radius to become smaller, since setting the maximum slewing angular velocity larger allows the actual slewing angular velocity to be larger as well, the workability can be improved while ensuring the safety. When the working radius becomes large due to the lodging operation of the attachment 10S, the safety can be ensured by further limiting the maximum slewing angular velocity. Note that such update of the maximum slewing angular velocity during the slewing operation is not limited to the case where the slewing information is the working radius, the derricking angle, or the like, and can be applied to other embodiments.

Furthermore, in addition to the working radius as described above, the slewing information acquired by the slewing operation information acquisition unit 800B may include information about the derricking angle of the boom 16 and the derricking angle of the jib 18. In this case, the angular velocity setting unit 801 can set the maximum slewing angular velocity based on at least the attachment information acquired by the attachment information acquisition unit 800A, the working radius acquired by the slewing operation information acquisition unit 800B, and the derricking angle of the boom 16 and the derricking angle of the jib 18. When the derricking angle of the boom 16 and the jib 18 of FIG. 1 changes, even if the working radius R1 (FIG. 20) is the same, the load factor, that is, the distortion of the attachment 10S with respect to the transverse load and stability change. As one example, for the same working radius, in a combination in which the derricking angle of the boom 16 is large (more upright) and the derricking angle of the jib 18 is small (more inverted), the distortion of the attachment 10S increases.

Therefore, with the configuration described above, even for the same working radius, considering that tolerance of the attachment 10S to the transverse load changes with the derricking angle of the boom 16 and the derricking angle of the jib 18, the optimal maximum slewing angular velocity can be set. Therefore, it is possible to perform safer slewing operations.

Note that in the above case, the angular velocity setting unit 801 preferably sets the maximum slewing angular velocity for the same working radius corresponding to the combination of the derricking angle of the boom 16 and the derricking angle of the jib 18 with maximum distortion of the attachment 10S due to the transverse load.

With this configuration, even for the same working radius, the maximum slewing angular velocity is set to correspond to the conditions of the derricking angle of the boom 16 and the derricking angle of the jib 18 that is the most severe in terms of distortion, therefore, it is possible to ensure the safety and perform the slewing operation. In this case, for a combination of different working radius, the derricking angle of the boom 16, and the derricking angle of the jib 18, the appropriate maximum slewing angular velocity is preferably stored in the storage unit 803 in advance. For the same working radius, the maximum slewing angular velocity corresponding to the combination with the largest distortion may be preferentially output from the storage unit 803.

Fifth Embodiment

Figure 22:
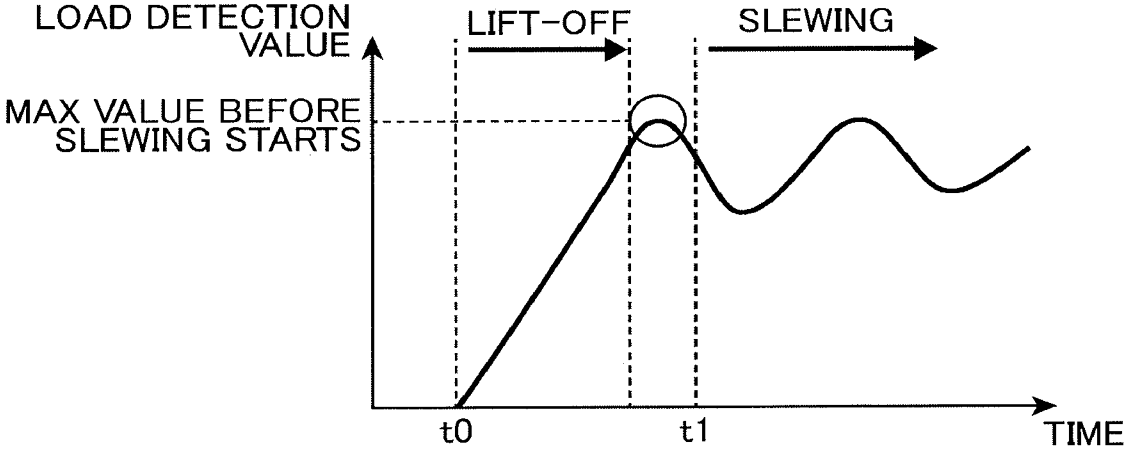
FIG. 22 is a graph showing the change of a load detection value of a hoist cargo in slewing control performed by a slewing control device according to a fifth embodiment of the present invention.
Figure 23:
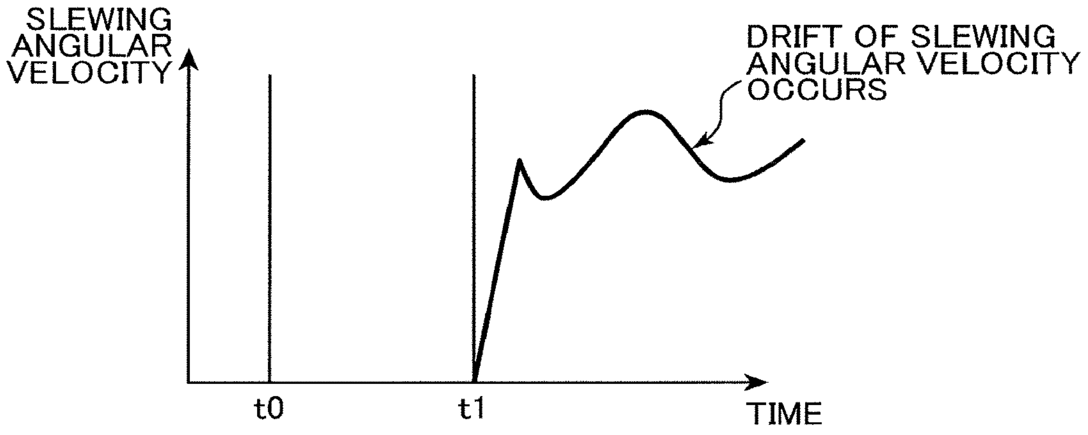
FIG. 23 is a graph showing drift of a slewing angular velocity of an upper slewing body.
Figure 24:
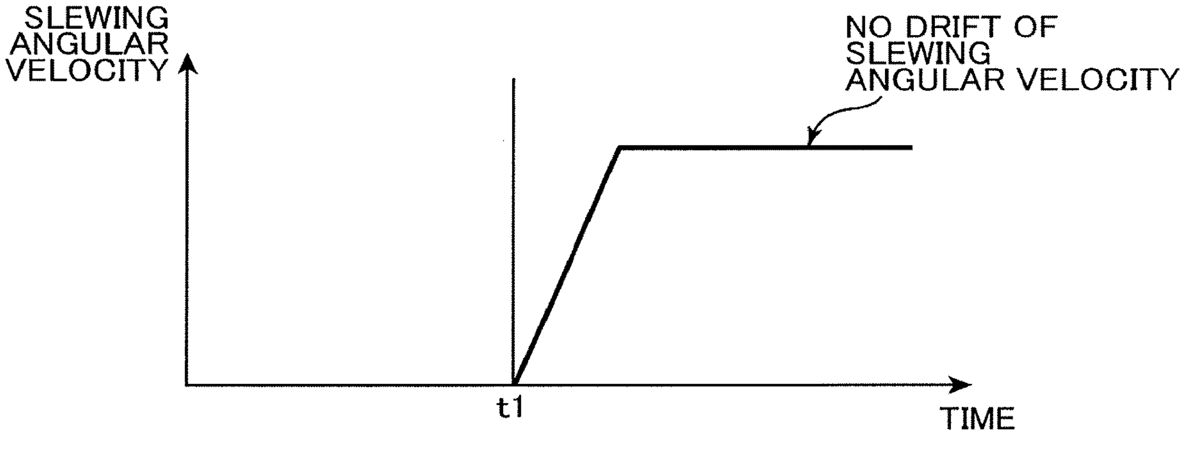
FIG. 24 is a graph showing the change of the slewing angular velocity of the upper slewing body in the slewing control performed by the slewing control device according to the fifth embodiment of the present invention.

Next, a crane 10 including a slewing control device 8S according to a fifth embodiment of the present invention will be described. FIG. 22 is a graph showing the change of a load detection value of a hoist cargo in slewing control performed by the slewing control device 8S according to the present embodiment. FIG. 23 is a graph showing drift of the slewing angular velocity of an upper slewing body 12. FIG. 24 is a graph showing the change of the slewing angular velocity of the upper slewing body 12 in the slewing control performed by the slewing control device 8S according to the present embodiment.

When performing the slewing operation of the upper slewing body 12 by hoisting the hoist cargo at a work site, the load detection value of the hoist cargo by a load detection unit 67 increases in response to a lift off operation from time to as shown in FIG. 22. Then, the slewing operation is generally started after the hoist cargo has completely lifted off (time t1). The load detection value of the hoist cargo detected by the load detection unit 67 often fluctuates under the influence of the inertia of the hoist cargo and the shaking of an attachment 10S (see FIG. 22).

Therefore, when the load factor (heavy load, light load) is updated during the slewing operation based on the load detection value of the hoist cargo detected by the load detection unit 67, there is a possibility that the slewing angular velocity limit value S1 changes from moment to moment, drift occurs in the slewing angular velocity as shown in FIG. 23, and the operability deteriorates. To solve such a problem, in the present embodiment, as shown in FIG. 22, an angular velocity setting unit 801 sets the slewing angular velocity limit value S1 in advance by using the maximum load detection value after the lift off of the hoist cargo is finished and before the slewing starts. By such control, as shown in FIG. 24, since the slewing angular velocity limit value S1 is fixed during the slewing operation, it is possible to prevent deterioration of operability, and since the slewing angular velocity limit value S1 is set using the maximum value of the detected hoist cargo load, the safety can be ensured sufficiently.

Note that the maximum value of the hoist cargo load described above may be determined from the maximum value of the previous detection value, triggered by the operation of an operation lever 81A for slewing. The worker may input the completion of lift-off from a switch (not shown) of an input unit 82 and the detection value of the hoist cargo load at that time may be adopted as the maximum value. Furthermore, the worker may input the hoist cargo load (maximum value) from the input unit 82, and the load value may be stored in a storage unit 803 and referred to by a slewing operation information acquisition unit 800B.

As described above, in the present embodiment, the slewing control device 8S further includes the load detection unit 67 that can detect the hoist cargo load. In the period after the hoist cargo is separated upward from the ground and before the slewing drive unit 7S slews the upper slewing body 12 in response to an operation input to the operation unit 81, the slewing operation information acquisition unit 800B sets the maximum slewing angular velocity based on the hoist cargo load detected by the load detection unit 67.

With such a configuration, the maximum slewing angular velocity can be set and the slewing operation of the upper slewing body 12 can be stably controlled without being affected by fluctuations in the load detection value due to the swing of the attachment 10S and wind during the slewing operation.

Sixth Embodiment

Next, a crane 10 including a slewing control device 8S according to a sixth embodiment of the present invention will be described. The above description has been given in an aspect in which an angular velocity setting unit 801 sets the maximum slewing angular velocity of an upper slewing body 12 according to the length of an attachment 10S, the hoist cargo load, the working radius, and the like. Here, the slewing information acquired by a slewing operation information acquisition unit 800B may include information about the posture of the attachment 10S (derricking angle of boom 16, jib 18). Then, the angular velocity setting unit 801 may set the maximum slewing angular velocity based on the attachment information acquired by an attachment information acquisition unit 800A and the ratio of the hoist cargo load to the rated load determined from the posture of the attachment acquired by the slewing operation information acquisition unit 800B. In this case, the rated load is preferably set to correspond to the maximum number of main winding ropes 50 that are put and hang down from the distal end of the attachment 10S. The rated load based on the general moment limit function (ML) is set based on the characteristics of the attachment 10S and the characteristics of a hydraulic circuit. However, since there is no need to consider the characteristics of the hydraulic circuit for the rated load referred to by the angular velocity setting unit 801, the characteristics of the attachment 10S can be considered exclusively. Therefore, the rated load is set based on the maximum number of main winding ropes 50 (number of windings) that are put between a main winding point sheave 56 of the sheave block (FIG. 1) and a sheave 58 of the sheave block provided on a main hook 57 for the hoist cargo. Therefore, the maximum value of the number of main winding ropes 50 that can be put between the above-mentioned sheaves is used, instead of the number of main winding ropes that are actually put. The rated load in this case can be referred to as the actual load factor of the attachment 10S attached.

According to the present embodiment, since the maximum slewing angular velocity is set by using the ratio of the hoist cargo load to the rated load determined from the capability of the attachment 10S, the safety and the workability of the crane 10 can be compatible.

Seventh Embodiment

Next, a crane 10 including a slewing control device 8S according to a seventh embodiment of the present invention will be described. In respective embodiments described above, the description has been given in an aspect in which the angular velocity setting unit 801 sets the maximum slewing angular velocity, and the slewing control unit 802 controls the slewing drive unit 7S such that the slewing angular velocity of the upper slewing body 12 does not exceed the maximum slewing angular velocity set by the angular velocity setting unit 801. Meanwhile, in the present embodiment, the slewing drive unit 7S is controlled in view of the peripheral speed of the distal end of an attachment 10S during the slewing operation of the upper slewing body 12. Note that since the distal end of the attachment 10S is ideally located directly above the hoist cargo, the peripheral speed of the distal end can be regarded as the peripheral speed of the hoist cargo.

Specifically, in the present embodiment, the angular velocity setting unit 801 sets the maximum slewing angular velocity when the upper slewing body 12 starts the slewing operation as in the previous embodiments, and further calculates the maximum peripheral speed corresponding to the maximum slewing angular velocity. At this time, the angular velocity setting unit 801 can calculate the maximum peripheral speed by multiplying the set maximum slewing angular velocity by the working radius. Furthermore, when the slewing operation of the upper slewing body 12 is started, the angular velocity setting unit 801 sets the maximum slewing angular velocity during the slewing operation as required such that the peripheral speed of the distal end of the attachment 10S does not exceed the maximum peripheral speed during the slewing operation.

With such a configuration, the maximum slewing angular velocity during the slewing operation is set such that the peripheral speed of the distal end of the attachment 10S, that is, the peripheral speed of the hoist cargo does not exceed the maximum peripheral speed. Therefore, since the maximum peripheral speed is controlled to be constant during the slewing operation, even if the working radius changes, the maximum value of the hoist cargo speed does not change, and the workability of the slewing work can be increased. Note that if the attachment 10S lodges during the slewing operation, the working radius will be bigger, causing the peripheral speed of the hoist cargo to increase. Therefore, by the control according to the present embodiment, the slewing angular velocity is limited such that the peripheral speed of the hoist cargo does not exceed the maximum peripheral speed. At this time, when viewed from the worker in the cab 15 (FIG. 1), even if the slewing angular velocity of the hoist cargo that is located farther away decreases, as long as the peripheral speed does not change significantly, the movement speed of the hoist cargo rarely gives a strange feeling. Therefore, by the control according to the present embodiment, even if the slewing angular velocity decreases with the lodging of the attachment 10S, the safety can be ensured without incurring a large decrease in the workability.

Eighth Embodiment

Next, a crane 10 including a slewing control device 8S according to an eighth embodiment of the present invention will be described. In respective embodiments described above, the description has been given in an aspect in which the angular velocity setting unit 801 sets the maximum slewing angular velocity, and the slewing control unit 802 controls the slewing drive unit 7S such that the slewing angular velocity of the upper slewing body 12 does not exceed the maximum slewing angular velocity set by the angular velocity setting unit 801. Meanwhile, in the present embodiment, a worker can input, from an input unit 82 (FIG. 3), the effective maximum slewing angular velocity with the maximum slewing angular velocity set by the angular velocity setting unit 801 as the maximum value. Then, the slewing control unit 802 is required at least to control the slewing drive unit 7S such that the slewing angular velocity of the upper slewing body 12 does not exceed the effective maximum slewing angular velocity that is input to the input unit 82. As one example, when the maximum slewing angular velocity set by the angular velocity setting unit 801 is 1.0 (rpm), the worker can manually input the effective maximum slewing angular velocity through the input unit 82 with the angular velocity as the maximum. In this case as well, the maximum value of the slewing angular velocity of the upper slewing body 12 corresponds to the maximum slewing angular velocity set by the angular velocity setting unit 801.

With such a configuration, the worker can further limit the maximum slewing angular velocity according to the ability and preference of the worker, thereby making it possible to perform the slewing operation more safely.

Note that in the above configuration, the input unit 82 may be configured to select the effective maximum slewing angular velocity step by step. Specifically, in the cab 15, as part of the input unit 82, three switches, low, middle, and high switches are arranged to set the slewing angular velocity. In this case, the high switch corresponds to the maximum slewing angular velocity (100%) set by the angular velocity setting unit 801. Meanwhile, the low switch corresponds to 60% of the maximum slewing angular velocity, and the middle switch corresponds to 80% of the maximum slewing angular velocity. Note that the form of each switch and the ratio to the maximum slewing angular velocity are not limited thereto.

With the above configuration, the worker can select the effective maximum slewing angular velocity step by step according to the strength and type of the hoist cargo and the like, thereby making it possible to perform the slewing operation more safely.

The slewing control device 8S according to respective embodiments of the present invention and the crane 10 including the slewing control device have been described above. In such a crane 10, the slewing drive unit 7S is controlled such that the slewing angular velocity of the upper slewing body 12 does not exceed at least the maximum slewing angular velocity that is set according to the attachment information on the attachment 10S. Since the attachment information is information for setting the maximum slewing angular velocity and the angular velocity setting unit 801 sets the maximum slewing angular velocity in the slewing operation of the upper slewing body 12 according to the attachment information, it is possible to perform the slewing operation stably while inhibiting the attachment 10S from being damaged or broken due to the large transverse load applied to the attachment 10S based on the slewing operation of the worker. Note that the present invention is not limited to these embodiments. The present invention can adopt the following modified embodiments, for example.

Figure 25:
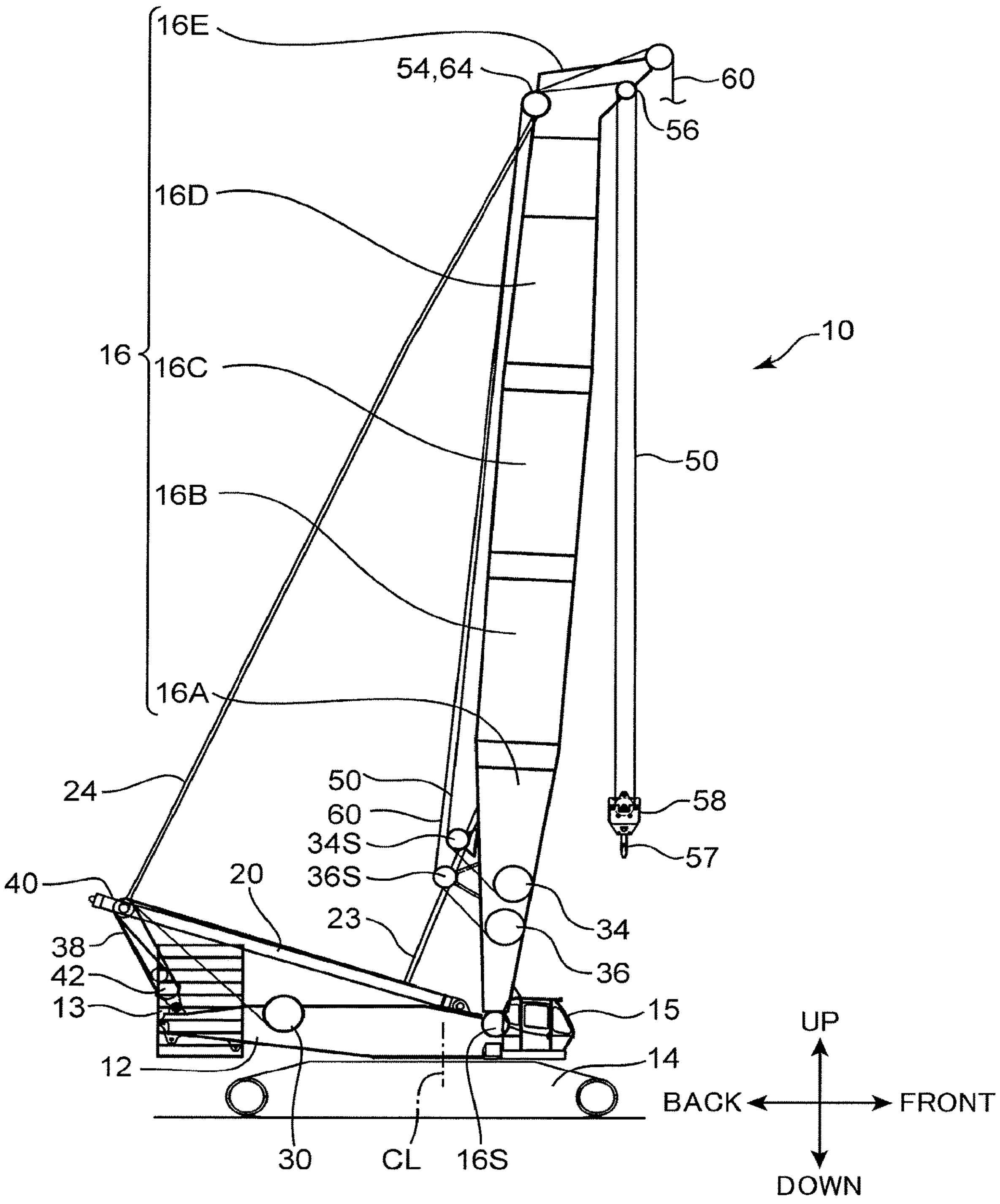
FIG. 25 is a side view of a crane including a slewing control device according to a modified embodiment of the present invention.

(1) In the above-described embodiments, descriptions have been given using the crane 10 shown in FIG. 1, but the present invention is not limited to this example. FIG. 25 is a side view of a crane 10 including a slewing control device 8S according to the modified embodiment of the present invention. In this modified embodiment, the crane 10 does not include a jib 18 (FIG. 1), and the hoist cargo is hoisted by hanging down a main winding rope 50 (hoist cargo rope) from the distal end of a boom 16 (attachment 10S). In this case, an attachment information acquisition unit 800A only needs to acquire information such as the length of the boom 16 as attachment information, and an angular velocity setting unit 801 only needs to set a slewing angular velocity limit value S1 in the slewing operation of an upper slewing body 12 according to the attachment information. In the previous first embodiment, only the length of the jib 18 of the attachment 10S may be acquired as the attachment information.

(2) The crane 10 shown in FIG. 1 may not include the rear strut 21 and the front strut 22, or may include one strut. The mast structure that supports the boom 16 is also not limited to the structure shown in FIG. 1, and may be another mast structure or a gantry structure (not shown).

(3) In respective embodiments described above, as the attachment information acquired by the attachment information acquisition unit 800A, the description has been given using the length information on the attachment 10S, but the present invention is not limited to this example. The attachment information may include information that is an index of strength against the transverse load, such as stiffness, strength, cross-sectional structure, and material properties of the attachment 10S (boom 16, jib 18, and the like). In this case, when the strength index is large, the angular velocity setting unit 801 may set the slewing angular velocity limit value S1 relatively large. The attachment information may include the years of use of the attachment 10S (elapsed years from date of manufacture), the number of attachments to and detachments from the upper slewing body 12, and the like. The angular velocity setting unit 801 may set the slewing angular velocity limit value S1 relatively small as the number of years and the number of times increase.

(4) The slewing operation information acquired by the slewing operation information acquisition unit 800B is not limited to the hoist cargo load and the working radius (derricking angle). The slewing operation information may include other information that affects cargo swing of the hoist cargo, swing of the attachment 10S, the transverse load acting on the attachment 10S, stress, and the like, such as wind speed at the work site.

(5) In respective embodiments described above, the description has been given in an aspect in which the slewing angular velocity limit value S1 of the upper slewing body 12 is set based on input of various pieces of information from the input unit 82 and information stored in the storage unit 803 (such as limit value map), but the present invention is not limited to this example. When the unique information and identification information on the attachment 10S are known, the angular velocity setting unit 801 may set the maximum slewing angular velocity (slewing angular velocity limit value S1) based on the information and an arithmetic expression prepared in advance. At least part of the control unit 80 including the attachment information acquisition unit 800A, the slewing operation information acquisition unit 800B, the angular velocity setting unit 801, and the like may not be mounted on the crane 10 and may be disposed at a distant remote control site. In this case, the slewing angular velocity limit value S1 may be transmitted from the site to the crane 10 (control unit 80) by using a communication device such as wireless. The control unit 80 (attachment information acquisition unit 800A, slewing operation information acquisition unit 800B, angular velocity setting unit 801) and the like may be provided in an operation device (not shown) held by the worker around the crane 10. Furthermore, what is input from the operation unit 81 is the model number (manufacturing number) of the attachment 20S, and the attachment information acquisition unit 800A may acquire length information corresponding to the model number from the storage unit 803.

(6) In the previous first embodiment, the description has been given in an aspect in which the slewing control unit 802 adjusts the tilt of the hydraulic pump 71 to limit the discharge amount (pump capacity) of the hydraulic oil discharged from the hydraulic pump 71, thereby limiting the slewing angular velocity of the upper slewing body 12. In the previous third embodiment, the description has been given in an aspect in which the secondary pressure of the first electromagnetic proportional valve 77 and the second electromagnetic proportional valve 78 shown in FIG. 2 is adjusted, and the control valve 73 adjusts the flow rate of the hydraulic oil, thereby limiting the slewing angular velocity of the upper slewing body 12. The present invention is not limited to this example. That is, by inputting, into the engine 70, the number of revolutions command signal corresponding to the maximum slewing angular velocity set by the angular velocity setting unit 801, the slewing control unit 802 may limit the number of revolutions of the engine 70 such that the slewing angular velocity of the upper slewing body 12 does not exceed the maximum slewing angular velocity. Note that the engine 70 includes an engine body and an engine controller. The engine controller receives the number of revolutions command signal and rotates the output shaft of the engine body with the fuel injection amount in response to the number of revolutions command signal.

With such a configuration, the slewing control unit 802 limits the number of revolutions of the engine 70 that is the most upstream drive source such that the slewing angular velocity of the upper slewing body 12 does not exceed the maximum slewing angular velocity, thereby allowing the slewing angular velocity of the upper slewing body 12 to be securely limited.

The crane slewing control device according to one aspect of the present invention is used for a crane including: a lower body; an upper slewing body supported by the lower body to be able to slew about a slewing center axis extending in an up-and-down direction with respect to the lower body; an operation unit that receives an operation to slew the upper slewing body with respect to the lower body and outputs a slewing command signal according to magnitude of the operation; a slewing drive unit capable of slewing the upper slewing body with respect to the lower body; an attachment including a proximal end pivotably supported by the upper slewing body in a hoisting direction and a distal end opposite the proximal end, the attachment being attachable to and detachable from the upper slewing body; and a hoist cargo rope hanging down from the distal end of the attachment and connected to a hoist cargo. The crane slewing control device includes an attachment information acquisition unit, an angular velocity setting unit, and a slewing control unit. The attachment information acquisition unit acquires attachment information. The attachment information is information peculiar to the attachment for setting a maximum slewing angular velocity that is a maximum value of a slewing angular velocity based on a transverse load that is a load along a slewing direction of the upper slewing body acting on the attachment due to the slewing angular velocity of the upper slewing body. The angular velocity setting unit sets the maximum slewing angular velocity that is allowed in a slewing operation of the upper slewing body based on at least the attachment information acquired by the attachment information acquisition unit. The slewing control unit receives the slewing command signal output from the operation unit and controls the slewing drive unit to cause the upper slewing body to slew with respect to the lower body in response to the slewing command signal. The slewing control unit controls the slewing drive unit such that the slewing angular velocity of the upper slewing body does not exceed the maximum slewing angular velocity set by the angular velocity setting unit.

With this configuration, since the attachment information is information for setting the maximum slewing angular velocity that is the maximum value of the slewing angular velocity based on the transverse load and the angular velocity setting unit can set the maximum slewing angular velocity in the slewing operation of the upper slewing body according to the attachment information, it is possible to efficiently inhibit the attachment from being damaged or broken due to the large transverse load applied to the attachment based on the slewing operation of the worker.

In the above configuration, preferably, the attachment information includes a length of the attachment from the proximal end to the distal end, and the angular velocity setting unit sets the maximum slewing angular velocity such that the maximum slewing angular velocity decreases as the length of the attachment increases.

With this configuration, since the angular velocity setting unit sets the maximum slewing angular velocity of the upper slewing body relatively small when the relatively long attachment is attached to the upper slewing body, it is possible to securely inhibit the attachment from being damaged or broken due to the large transverse load applied to the attachment.

In the above configuration, preferably, a slewing information acquisition unit that acquires slewing information is further provided, the slewing information is information related to a condition of the slewing operation for setting the maximum slewing angular velocity, and the angular velocity setting unit sets the maximum slewing angular velocity based on the attachment information acquired by the attachment information acquisition unit and the slewing information acquired by the slewing information acquisition unit.

With this configuration, since the angular velocity setting unit sets the maximum slewing angular velocity based on the slewing information in the slewing operation of the crane in addition to the attachment information peculiar to the attachment, it is possible to further inhibit the attachment from being damaged or broken due to the large transverse load applied to the attachment.

In the above configuration, preferably, the slewing information includes information corresponding to a hoist cargo load that is a load of the hoist cargo connected to the hoist cargo rope, and the angular velocity setting unit sets the maximum slewing angular velocity based on at least the attachment information acquired by the attachment information acquisition unit and the hoist cargo load acquired by the slewing information acquisition unit.

With this configuration, since the angular velocity setting unit sets the maximum slewing angular velocity based on the hoist cargo load that can have a significant impact on the transverse load acting on the attachment in addition to the attachment information, it is possible to set an appropriate maximum slewing angular velocity according to the hoist cargo actually hoisted.

In the above configuration, preferably, the angular velocity setting unit sets the maximum slewing angular velocity such that the maximum slewing angular velocity decreases as the hoist cargo load increases in the same attachment information.

With this configuration, when the hoist cargo with the relatively large load is connected to the attachment, the angular velocity setting unit sets the maximum slewing angular velocity of the upper slewing body relatively small, and therefore it is possible to securely inhibit the attachment from being damaged or broken due to a large transverse load applied to the attachment.

In the above configuration, preferably, a load detection unit capable of detecting the hoist cargo load is further provided, in which the angular velocity setting unit sets the maximum slewing angular velocity based on the hoist cargo load detected by the load detection unit in a period after the hoist cargo is separated upward from ground and before the slewing drive unit slews the upper slewing body in response to the operation input to the operation unit.

With this configuration, since the maximum slewing angular velocity can be set without being affected by fluctuations in the load detection value due to the swing of the attachment, wind, and the like during the slewing operation, the slewing operation of the upper slewing body can be stably controlled.

In the above configuration, preferably, the slewing information acquired by the slewing information acquisition unit includes information about a preset maximum hoist cargo load that is a maximum load of the hoist cargo connected to the hoist cargo rope, and the angular velocity setting unit sets the maximum slewing angular velocity based on the attachment information acquired by the attachment information acquisition unit and the maximum hoist cargo load.

With this configuration, when the upper slewing body performs the slewing operation, the maximum slewing angular velocity can be set without the need to detect and reflect the current hoist cargo load.

In the above configuration, preferably, the slewing information includes information about a posture of the attachment, the angular velocity setting unit sets the maximum slewing angular velocity based on the attachment information acquired by the attachment information acquisition unit and a ratio of the hoist cargo load to a rated load determined from the posture of the attachment acquired by the slewing information acquisition unit, and the rated load is set corresponding to a maximum number of the hoist cargo ropes hanging down from the distal end of the attachment.

With this configuration, by setting the maximum slewing angular velocity by using the ratio of the hoist cargo load to the rated load determined from the capability of the attachment, the safety and the workability of the crane can be compatible.

In the above configuration, preferably, the angular velocity setting unit sets the maximum slewing angular velocity when the slewing operation of the upper slewing body starts, and maintains the set maximum slewing angular velocity during the slewing operation.

With this configuration, the maximum slewing angular velocity does not change during the slewing operation, making it possible to prevent the operability of the worker from being decreased due to the frequent occurrence of sudden change in the angular velocity of the upper slewing body.

In the above configuration, preferably, the angular velocity setting unit updates the maximum slewing angular velocity at predetermined intervals during the slewing operation of the upper slewing body, and the slewing control unit controls the slewing drive unit such that the slewing angular velocity of the upper slewing body does not exceed the maximum slewing angular velocity updated by the angular velocity setting unit.

With this configuration, since the maximum slewing angular velocity is updated according to the change in the slewing information during the slewing operation, the workability can be improved while ensuring the safety.

In the above configuration, preferably, the slewing information acquired by the slewing information acquisition unit includes information about a working radius that is a distance from the proximal end to the distal end of the attachment in plan view, and the angular velocity setting unit sets the maximum slewing angular velocity based on at least the attachment information acquired by the attachment information acquisition unit and the working radius acquired by the slewing information acquisition unit.

With this configuration, since the angular velocity setting unit sets the maximum slewing angular velocity based on the working radius that can have a significant impact on the transverse load acting on the attachment in addition to the attachment information, it is possible to securely inhibit the large transverse load from acing on the attachment.

In the above configuration, preferably, the angular velocity setting unit sets the maximum slewing angular velocity such that the maximum slewing angular velocity decreases as the working radius increases in the same attachment information.

With this configuration, since the angular velocity setting unit sets the maximum slewing angular velocity of the upper slewing body relatively small when a relatively large working radius is set for the attachment, it is possible to securely inhibit the attachment from being damaged or broken due to a large transverse load applied to the attachment.

In the above configuration, preferably, the attachment includes: a boom that includes the proximal end and is pivotably supported by the upper slewing body in a hoisting direction; and a jib that includes the distal end and is pivotably supported by the boom in the hoisting direction, the slewing information further includes information about a derricking angle of the boom and a derricking angle of the jib, and the angular velocity setting unit sets the maximum slewing angular velocity based on at least the attachment information acquired by the attachment information acquisition unit, the working radius acquired by the slewing information acquisition unit, the derricking angle of the boom, and the derricking angle of the jib.

With this configuration, even for the same working radius, considering that tolerance of the attachment to the transverse load changes with the derricking angle of the boom and the derricking angle of the jib, optimal maximum slewing angular velocity can be set.

In the above configuration, preferably, the angular velocity setting unit sets the maximum slewing angular velocity for the same working radius according to a combination of the derricking angle of the boom and the derricking angle of the jib with maximum distortion of the attachment by the transverse load.

With this configuration, even for the same working radius, the maximum slewing angular velocity is set to correspond to the conditions of the derricking angle of the boom and the derricking angle of the jib that are the most severe in terms of distortion, therefore, it is possible to ensure the safety and perform the slewing operation.

In the above configuration, preferably, for the working radius, the slewing information includes information about a maximum working radius set according to the load of the hoist cargo to prevent the crane from falling over, and the angular velocity setting unit sets the maximum slewing angular velocity based on the attachment information acquired by the attachment information acquisition unit and the maximum working radius acquired by the slewing information acquisition unit.

With this configuration, when the upper slewing body performs the slewing operation, the maximum slewing angular velocity can be set without the need to detect and reflect the current working radius.

In the above configuration, preferably, the angular velocity setting unit sets the maximum slewing angular velocity when the slewing operation of the upper slewing body starts, and maintains the set maximum slewing angular velocity during the slewing operation.

With this configuration, the maximum slewing angular velocity does not change during the slewing operation, making it possible to prevent the operability of the worker from being decreased due to the frequent occurrence of sudden change in the angular velocity of the upper slewing body.

In the above configuration, preferably, the angular velocity setting unit updates the maximum slewing angular velocity at predetermined intervals during the slewing operation of the upper slewing body, and the slewing control unit controls the slewing drive unit such that the slewing angular velocity of the upper slewing body does not exceed the maximum slewing angular velocity updated by the angular velocity setting unit.

With this configuration, since the maximum slewing angular velocity is updated according to the change in the slewing information during the slewing operation, the workability can be improved while ensuring the safety.

In the above configuration, preferably, the slewing information acquisition unit acquires information about the working radius that changes with a hoisting operation of the attachment during the slewing operation of the upper slewing body, and the angular velocity setting unit updates the maximum slewing angular velocity based on the information about the working radius acquired by the slewing information acquisition unit.

With this configuration, even if the working radius changes due to the hoisting operation of the attachment during the slewing operation, the optimal maximum slewing angular velocity can be set. In particular, when the standing movement of the attachment causes the working radius to become smaller, since setting the maximum slewing angular velocity larger allows the actual slewing angular velocity to be larger as well, the workability can be improved while ensuring the safety. When the working radius becomes large due to the lodging operation of the attachment, the safety can be ensured by further limiting the slewing angular velocity.

In the above configuration, preferably, the angular velocity setting unit sets the maximum slewing angular velocity when the slewing operation of the upper slowing body starts, further calculates a maximum peripheral speed corresponding to the maximum slewing angular velocity, and sets the maximum slewing angular velocity such that a peripheral speed of the distal end of the attachment does not exceed the maximum peripheral speed during the slewing operation of the upper slewing body.

With this configuration, since the maximum peripheral speed is controlled to be constant during the slewing operation, even if the working radius changes, the maximum value of the hoist cargo speed does not change, and the workability can be increased.

In the above configuration, preferably, an input unit is further provided that allows a worker to input an effective maximum slewing angular velocity with the maximum slewing angular velocity set by the angular velocity setting unit as a maximum value, in which the slewing control unit controls the slewing drive unit such that the slewing angular velocity of the upper slewing body does not exceed the effective maximum slewing angular velocity that is input into the input unit.

With this configuration, the worker can further limit the maximum slewing angular velocity according to the ability and preference of the worker, thereby making it possible to perform the slewing operation more safely.

In the above configuration, preferably, the input unit is configured to select the effective maximum slewing angular velocity step by step.

With this configuration, the worker can select the effective maximum slewing angular velocity step by step according to the strength and type of the hoist cargo and the like, thereby making it possible to perform the slewing operation more safely.

In the above configuration, preferably, the slewing drive unit of the crane includes: an engine including an output shaft; a variable displacement type hydraulic pump that is coupled to the output shaft and discharges a hydraulic oil by power input from the output shaft, the hydraulic pump being able to receive input of a tilt command signal and change a maximum discharge amount of the hydraulic oil according to magnitude of the tilt command signal; a hydraulic slewing motor that includes a plurality of hydraulic chambers inside and generates driving force to slew the upper slewing body by receiving the hydraulic oil supplied from the hydraulic pump into one of the plurality of hydraulic chambers and discharging the hydraulic oil from another hydraulic chamber of the plurality of hydraulic chambers; and a flow rate adjustment mechanism that includes a control valve interposed between the hydraulic pump and the slewing motor, and adjusts a flow rate of the hydraulic oil supplied to the slewing motor out of the hydraulic oil discharged from the hydraulic pump in response to the slewing command signal output from the operation unit, and the slewing control unit limits a discharge amount of the hydraulic oil discharged from the hydraulic pump such that the slewing angular velocity of the upper slewing body does not exceed the maximum slewing angular velocity by inputting the tilt command signal corresponding to the maximum slewing angular velocity set by the angular velocity setting unit into the hydraulic pump.

With this configuration, the slewing control unit limits the discharge amount of the hydraulic oil to be discharged from the hydraulic pump such that the slewing angular velocity of the upper slewing body does not exceed the maximum slewing angular velocity by adjusting the tilt of the hydraulic pump, making it possible to securely limit the slewing angular velocity of the upper slewing body.

In the above configuration, preferably, the hydraulic pump discharges the hydraulic oil of a minimum discharge amount greater than zero, and when the discharge amount of the hydraulic pump corresponding to the maximum slewing angular velocity set by the angular velocity setting unit is greater than the minimum discharge amount, the slewing control unit limits the discharge amount of the hydraulic oil discharged from the hydraulic pump such that the slewing angular velocity of the upper slewing body does not exceed the maximum slewing angular velocity by inputting the tilt command signal corresponding to the maximum slewing angular velocity into the hydraulic pump, meanwhile, when the discharge amount of the hydraulic pump corresponding to the maximum slewing angular velocity set by the angular velocity setting unit is smaller than the minimum discharge amount, the slewing control unit limits the flow rate of the hydraulic oil supplied from the flow rate adjustment mechanism to the slewing motor such that the slewing angular velocity of the upper slewing body does not exceed the maximum slewing angular velocity regardless of magnitude of the slewing command signal by inputting a compulsory command signal corresponding to the maximum slewing angular velocity into the flow rate adjustment mechanism.

With this configuration, due to the performance of the hydraulic pump, even if the maximum slewing angular velocity required by the angular velocity setting unit cannot be achieved by tilt adjustment of the hydraulic pump, by the slewing control unit inputting the compulsory command signal in the flow rate adjustment mechanism, the flow rate of the hydraulic oil supplied to the slewing motor can be limited, and the slewing angular velocity of the upper slewing body can be securely limited.

In the above configuration, preferably, the slewing drive unit of the crane includes: an engine including an output shaft; a hydraulic pump that is coupled to the output shaft and discharges a hydraulic oil by power input from the output shaft; a hydraulic slewing motor that includes a plurality of hydraulic chambers inside and generates driving force to slew the upper slewing body by receiving the hydraulic oil supplied from the hydraulic pump into one of the plurality of hydraulic chambers and discharging the hydraulic oil from another hydraulic chamber of the plurality of hydraulic chambers; and a flow rate adjustment mechanism that includes a control valve interposed between the hydraulic pump and the slewing motor and adjusts a flow rate of the hydraulic oil supplied to the slewing motor out of the hydraulic oil discharged from the hydraulic pump in response to the slewing command signal output from the operation unit, and by inputting a compulsory command signal corresponding to the maximum slewing angular velocity set by the angular velocity setting unit into the flow rate adjustment mechanism, the slewing control unit limits the flow rate of the hydraulic oil supplied from the flow rate adjustment mechanism to the slewing motor such that the slewing angular velocity of the upper slewing body does not exceed the maximum slewing angular velocity regardless of magnitude of the slewing command signal.

With this configuration, by inputting the compulsory command signal into the flow rate adjustment mechanism, the slewing control unit limits the supply amount of the hydraulic oil to the hydraulic motor such that the slewing angular velocity of the upper slewing body does not exceed the maximum slewing angular velocity, making it possible to securely limit the slewing angular velocity of the upper slewing body.

In the above configuration, preferably, the slewing drive unit of the crane includes: an engine including an output shaft; a hydraulic pump that is coupled to the output shaft and discharges a hydraulic oil by power input from the output shaft; a hydraulic slewing motor that includes a plurality of hydraulic chambers inside and generates driving force to slew the upper slewing body by receiving the hydraulic oil supplied from the hydraulic pump into one of the plurality of hydraulic chambers and discharging the hydraulic oil from another hydraulic chamber of the plurality of hydraulic chambers; and a flow rate adjustment mechanism that includes a control valve interposed between the hydraulic pump and the slewing motor and adjusts a flow rate of the hydraulic oil supplied to the slewing motor out of the hydraulic oil discharged from the hydraulic pump in response to the slewing command signal output from the operation unit, and the slewing control unit limits a number of revolutions of the engine such that the slewing angular velocity of the upper slewing body does not exceed the maximum slewing angular velocity.

With this configuration, the slewing control unit limits the number of revolutions of the engine such that the slewing angular velocity of the upper slewing body does not exceed the maximum slewing angular velocity, making it possible to securely limit the slewing angular velocity of the upper slewing body.

A crane according to another aspect of the present invention includes: a lower body; an upper slewing body supported by the lower body to be able to slew about a slewing center axis extending in an up-and-down direction with respect to the lower body; an operation unit that receives an operation to slew the upper slewing body with respect to the lower body and outputs a slewing command signal according to magnitude of the operation; a slewing drive unit capable of slewing the upper slewing body with respect to the lower body; an attachment including a proximal end pivotably supported by the upper slewing body in a hoisting direction and a distal end opposite the proximal end, the attachment being attachable to and detachable from the upper slewing body; a hoist cargo rope hanging down from the distal end of the attachment and connected to a hoist cargo; and the slewing control device described above that controls the slewing drive unit such that the slewing angular velocity of the upper slewing body does not exceed at least the maximum slewing angular velocity set according to the attachment information on the attachment.

With this configuration, since the angular velocity setting unit sets the maximum slewing angular velocity in the slewing operation of the upper slewing body according to the attachment information, it is possible to perform the slewing operation stably while efficiently inhibiting the attachment from being damaged or broken due to a large transverse load applied to the attachment based on the slewing operation of the worker.

The present invention provides a crane slewing control device and a crane including the slewing control device that can efficiently inhibit the large transverse load from being applied to the attachment by the slewing operation of the upper slewing body based on the worker's slewing operation and inhibit the attachment from being damaged or broken.

The invention claimed is:

1. A crane slewing control device used for a crane including:

a lower body;

an upper slewing body supported by the lower body to be able to slew about a slewing center axis extending in an up-and-down direction with respect to the lower body;

a controller including circuitry that receives an operation to slew the upper slewing body with respect to the lower body and outputs a slewing command signal according to magnitude of the operation, the controller allowing an operation by a worker for slewing the upper slewing body to be applied to the controller;

a slewing drive unit capable of slewing the upper slewing body with respect to the lower body;

an attachment including a proximal end pivotably supported by the upper slewing body in a hoisting direction and a distal end opposite the proximal end, the attachment being attachable to and detachable from the upper slewing body; and a hoist cargo rope hanging down from the distal end of the attachment and connected to a hoist cargo, the crane slewing control device comprising:

an attachment information acquisition unit that acquires attachment information, the attachment information being information peculiar to the attachment for setting a maximum slewing angular velocity that is a maximum value of a slewing angular velocity based on a transverse load that is a load along a slewing direction of the upper slewing body acting on the attachment due to the slewing angular velocity of the upper slewing body;

a slewing control unit that receives the slewing command signal output from the controller and controls the slewing drive unit to cause the upper slewing body to slew with respect to the lower body in response to the slewing command signal;

an angular velocity setting unit that sets the maximum slewing angular velocity that is allowed in a slewing operation of the upper slewing body based on at least the attachment information acquired by the attachment information acquisition unit; and a storage unit that stores limit values of the maximum slewing angular velocity for the attachment information, each of the limit values of the maximum slewing angular velocity for the attachment information stored in the storage unit is set to a smaller of a slewing angular velocity corresponding to an allowed value of a swing of the attachment, and a slewing angular velocity corresponding to an allowed value of a stress of the attachment, the angular velocity setting unit sets the maximum slewing angular velocity that is allowed in the slewing operation of the upper slewing body with reference to the limit values stored in the storage unit based on at least the attachment information acquired by the attachment information acquisition unit, the slewing control unit controls the slewing drive unit such that the slewing angular velocity of the upper slewing body does not exceed the maximum slewing angular velocity set by the angular velocity setting unit.

2. The crane slewing control device according to claim 1, wherein the attachment information includes a length of the attachment from the proximal end to the distal end, and the angular velocity setting unit sets the maximum slewing angular velocity such that the maximum slewing angular velocity decreases as the length of the attachment increases.

3. The crane slewing control device according to claim 1, further comprising a slewing information acquisition unit that acquires slewing information, the slewing information being information related to a condition of the slewing operation for setting the maximum slewing angular velocity, wherein the angular velocity setting unit sets the maximum slewing angular velocity based on the attachment information acquired by the attachment information acquisition unit and the slewing information acquired by the slewing information acquisition unit.

4. The crane slewing control device according to claim 3, wherein the slewing information includes information corresponding to a hoist cargo load that is a load of the hoist cargo connected to the hoist cargo rope, and the angular velocity setting unit sets the maximum slewing angular velocity based on at least the attachment information acquired by the attachment information acquisition unit and the hoist cargo load acquired by the slewing information acquisition unit.

5. The crane slewing control device according to claim 4, wherein the angular velocity setting unit sets the maximum slewing angular velocity such that the maximum slewing angular velocity decreases as the hoist cargo load increases in the same attachment information.

6. The crane slewing control device according to claim 4, further comprising a load detection unit capable of detecting the hoist cargo load, wherein the angular velocity setting unit sets the maximum slewing angular velocity based on the hoist cargo load detected by the load detection unit in a period after the hoist cargo is separated upward from ground and before the slewing drive unit slews the upper slewing body in response to the operation input to the controller.

7. The crane slewing control device according to claim 4, wherein the slewing information acquired by the slewing information acquisition unit includes information about a preset maximum hoist cargo load that is a maximum load of the hoist cargo connected to the hoist cargo rope, and the angular velocity setting unit sets the maximum slewing angular velocity based on the attachment information acquired by the attachment information acquisition unit and the maximum hoist cargo load.

8. The crane slewing control device according to claim 4, wherein the slewing information includes information about a posture of the attachment, the angular velocity setting unit sets the maximum slewing angular velocity based on the attachment information acquired by the attachment information acquisition unit and a ratio of the hoist cargo load to a rated load determined from the posture of the attachment acquired by the slewing information acquisition unit, and the rated load is set corresponding to a maximum number of the hoist cargo ropes hanging down from the distal end of the attachment.

9. The crane slewing control device according to claim 4, wherein the angular velocity setting unit sets the maximum slewing angular velocity when the slewing operation of the upper slewing body starts, and maintains the set maximum slewing angular velocity during the slewing operation.

10. The crane slewing control device according to claim 3, wherein the angular velocity setting unit updates the maximum slewing angular velocity at predetermined intervals during the slewing operation of the upper slewing body, and the slewing control unit controls the slewing drive unit such that the slewing angular velocity of the upper slewing body does not exceed the maximum slewing angular velocity updated by the angular velocity setting unit.

11. The crane slewing control device according to claim 3, wherein the slewing information acquired by the slewing information acquisition unit includes information about a working radius that is a distance from the proximal end to the distal end of the attachment in plan view, and the angular velocity setting unit sets the maximum slewing angular velocity based on at least the attachment information acquired by the attachment information acquisition unit and the working radius acquired by the slewing information acquisition unit.

12. The crane slewing control device according to claim 11, wherein the angular velocity setting unit sets the maximum slewing angular velocity such that the maximum slewing angular velocity decreases as the working radius increases in the same attachment information.

13. The crane slewing control device according to claim 11, wherein the attachment includes: a boom that includes the proximal end and is pivotably supported by the upper slewing body in a hoisting direction; and a jib that includes the distal end and is pivotably supported by the boom in the hoisting direction, the slewing information further includes information about a derricking angle of the boom and a derricking angle of the jib, and the angular velocity setting unit sets the maximum slewing angular velocity based on at least the attachment information acquired by the attachment information acquisition unit, the working radius acquired by the slewing information acquisition unit, the derricking angle of the boom, and the derricking angle of the jib.

14. The crane slewing control device according to claim 13, wherein the angular velocity setting unit sets the maximum slewing angular velocity for a specific working radius according to a combination of the derricking angle of the boom and the derricking angle of the jib at which distortion of the attachment attributed to the transverse load is maximum, the specific working radius being a radius that remains unchanged regardless of a change in each of the derricking angles of the boom and the jib change.

15. The crane slewing control device according to claim 11, wherein for the working radius, the slewing information includes information about a maximum working radius set according to the load of the hoist cargo to prevent the crane from falling over, and the angular velocity setting unit sets the maximum slewing angular velocity based on the attachment information acquired by the attachment information acquisition unit and the maximum working radius acquired by the slewing information acquisition unit.

16. The crane slewing control device according to claim 15, wherein the angular velocity setting unit sets the maximum slewing angular velocity when the slewing operation of the upper slewing body starts, and maintains the set maximum slewing angular velocity during the slewing operation.

17. The crane slewing control device according to claim 11, wherein the angular velocity setting unit updates the maximum slewing angular velocity at predetermined intervals during the slewing operation of the upper slewing body, and the slewing control unit controls the slewing drive unit such that the slewing angular velocity of the upper slewing body does not exceed the maximum slewing angular velocity updated by the angular velocity setting unit.

18. The crane slewing control device according to claim 17, wherein the slewing information acquisition unit acquires information about the working radius that changes with a hoisting operation of the attachment during the slewing operation of the upper slewing body, and the angular velocity setting unit updates the maximum slewing angular velocity based on the information about the working radius acquired by the slewing information acquisition unit.

19. The crane slewing control device according to claim 1, wherein the angular velocity setting unit sets the maximum slewing angular velocity when the slewing operation of the upper slewing body starts, further calculates a maximum peripheral speed corresponding to the maximum slewing angular velocity, and sets the maximum slewing angular velocity such that a peripheral speed of the distal end of the attachment does not exceed the maximum peripheral speed during the slewing operation of the upper slewing body.

20. The crane slewing control device according to claim 1, further comprising an input unit that allows the worker to input an effective maximum slewing angular velocity, the effective maximum slewing angular velocity being a value that is the maximum slewing angular velocity set by the angular velocity setting unit as a maximum value, wherein the slewing control unit controls the slewing drive unit such that the slewing angular velocity of the upper slewing body does not exceed the effective maximum slewing angular velocity that is input into the input unit.

21. The crane slewing control device according to claim 20, wherein the input unit is configured to select the effective maximum slewing angular velocity step by step.

22. The crane slewing control device according to claim 1, wherein the slewing drive unit of the crane includes:

an engine including an output shaft;

a variable displacement hydraulic pump that is coupled to the output shaft and discharges a hydraulic oil by power input from the output shaft, the hydraulic pump being able to receive input of a tilt command signal and change a maximum discharge amount of the hydraulic oil according to magnitude of the tilt command signal;

a hydraulic slewing motor that includes a plurality of hydraulic chambers inside and generates driving force to slew the upper slewing body by receiving the hydraulic oil supplied from the hydraulic pump into one of the plurality of hydraulic chambers and discharging the hydraulic oil from another hydraulic chamber of the plurality of hydraulic chambers; and a flow rate adjustment mechanism that includes a control valve interposed between the hydraulic pump and the slewing motor, and adjusts a flow rate of the hydraulic oil supplied to the slewing motor out of the hydraulic oil discharged from the hydraulic pump in response to the slewing command signal output from the controller, and the slewing control unit limits a discharge amount of the hydraulic oil discharged from the hydraulic pump such that the slewing angular velocity of the upper slewing body does not exceed the maximum slewing angular velocity by inputting the tilt command signal corresponding to the maximum slewing angular velocity set by the angular velocity setting unit into the hydraulic pump.

23. The crane slewing control device according to claim 1, wherein the slewing drive unit of the crane includes:

an engine including an output shaft;

a hydraulic pump that is coupled to the output shaft and discharges a hydraulic oil by power input from the output shaft;

a hydraulic slewing motor that includes a plurality of hydraulic chambers inside and generates driving force to slew the upper slewing body by receiving the hydraulic oil supplied from the hydraulic pump into one of the plurality of hydraulic chambers and discharging the hydraulic oil from another hydraulic chamber of the plurality of hydraulic chambers; and a flow rate adjustment mechanism that includes a control valve interposed between the hydraulic pump and the slewing motor and adjusts a flow rate of the hydraulic oil supplied to the slewing motor out of the hydraulic oil discharged from the hydraulic pump in response to the slewing command signal output from the controller, and by inputting a compulsory command signal corresponding to the maximum slewing angular velocity set by the angular velocity setting unit into the flow rate adjustment mechanism, the slewing control unit limits the flow rate of the hydraulic oil supplied from the flow rate adjustment mechanism to the slewing motor such that the slewing angular velocity of the upper slewing body does not exceed the maximum slewing angular velocity regardless of magnitude of the slewing command signal.

24. The crane slewing control device according to claim 1, wherein the slewing drive unit of the crane includes:

an engine including an output shaft;

a hydraulic pump that is coupled to the output shaft and discharges a hydraulic oil by power input from the output shaft;

a hydraulic slewing motor that includes a plurality of hydraulic chambers inside and generates driving force to slew the upper slewing body by receiving the hydraulic oil supplied from the hydraulic pump into one of the plurality of hydraulic chambers and discharging the hydraulic oil from another hydraulic chamber of the plurality of hydraulic chambers; and a flow rate adjustment mechanism that includes a control valve interposed between the hydraulic pump and the slewing motor and adjusts a flow rate of the hydraulic oil supplied to the slewing motor out of the hydraulic oil discharged from the hydraulic pump in response to the slewing command signal output from the controller, and the slewing control unit limits a number of revolutions of the engine such that the slewing angular velocity of the upper slewing body does not exceed the maximum slewing angular velocity.

25. A crane slewing control device used for a crane including:

a lower body;

an upper slewing body supported by the lower body to be able to slew about a slewing center axis extending in an up-and-down direction with respect to the lower body;

a controller including circuitry that receives an operation to slew the upper slewing body with respect to the lower body and outputs a slewing command signal according to magnitude of the operation, the controller allowing an operation by a worker for slewing the upper slewing body to be applied to the controller;

a slewing drive unit capable of slewing the upper slewing body with respect to the lower body;

an attachment including a proximal end pivotably supported by the upper slewing body in a hoisting direction and a distal end opposite the proximal end, the attachment being attachable to and detachable from the upper slewing body; and a hoist cargo rope hanging down from the distal end of the attachment and connected to a hoist cargo, the crane slewing control device comprising:

an attachment information acquisition unit that acquires attachment information, the attachment information being information peculiar to the attachment for setting a maximum slewing angular velocity that is a maximum value of a slewing angular velocity based on a transverse load that is a load along a slewing direction of the upper slewing body acting on the attachment due to the slewing angular velocity of the upper slewing body;

an angular velocity setting unit that sets the maximum slewing angular velocity that is allowed in a slewing operation of the upper slewing body based on at least the attachment information acquired by the attachment information acquisition unit; and a slewing control unit that receives the slewing command signal output from the controller and controls the slewing drive unit to cause the upper slewing body to slew with respect to the lower body in response to the slewing command signal, the slewing control unit controlling the slewing drive unit such that the slewing angular velocity of the upper slewing body does not exceed the maximum slewing angular velocity set by the angular velocity setting unit, wherein the slewing drive unit of the crane includes:

an engine including an output shaft;

a variable displacement hydraulic pump that is coupled to the output shaft and discharges a hydraulic oil by power input from the output shaft, the hydraulic pump being able to receive input of a tilt command signal and change a maximum discharge amount of the hydraulic oil according to magnitude of the tilt command signal;

a hydraulic slewing motor that includes a plurality of hydraulic chambers inside and generates driving force to slew the upper slewing body by receiving the hydraulic oil supplied from the hydraulic pump into one of the plurality of hydraulic chambers and discharging the hydraulic oil from another hydraulic chamber of the plurality of hydraulic chambers; and a flow rate adjustment mechanism that includes a control valve interposed between the hydraulic pump and the slewing motor, and adjusts a flow rate of the hydraulic oil supplied to the slewing motor out of the hydraulic oil discharged from the hydraulic pump in response to the slewing command signal output from the controller, the slewing control unit limits a discharge amount of the hydraulic oil discharged from the hydraulic pump such that the slewing angular velocity of the upper slewing body does not exceed the maximum slewing angular velocity by inputting the tilt command signal corresponding to the maximum slewing angular velocity set by the angular velocity setting unit into the hydraulic pump, the hydraulic pump discharges the hydraulic oil of a minimum discharge amount greater than zero, and when the discharge amount of the hydraulic pump corresponding to the maximum slewing angular velocity set by the angular velocity setting unit is greater than the minimum discharge amount, the slewing control unit limits the discharge amount of the hydraulic oil discharged from the hydraulic pump such that the slewing angular velocity of the upper slewing body does not exceed the maximum slewing angular velocity by inputting the tilt command signal corresponding to the maximum slewing angular velocity into the hydraulic pump, meanwhile, when the discharge amount of the hydraulic pump corresponding to the maximum slewing angular velocity set by the angular velocity setting unit is smaller than the minimum discharge amount, the slewing control unit limits the flow rate of the hydraulic oil supplied from the flow rate adjustment mechanism to the slewing motor such that the slewing angular velocity of the upper slewing body does not exceed the maximum slewing angular velocity regardless of magnitude of the slewing command signal by inputting a compulsory command signal corresponding to the maximum slewing angular velocity into the flow rate adjustment mechanism.

26. A crane comprising:

the crane slewing control device according to claim 1;

the lower body;

the upper slewing body supported by the lower body to be able to slew about the slewing center axis extending in an up-and-down direction with respect to the lower body;

the controller that receives an operation to slew the upper slewing body with respect to the lower body and outputs a slewing command signal according to magnitude of the operation;

the slewing drive unit capable of slewing the upper slewing body with respect to the lower body;

the attachment including the proximal end pivotably supported by the upper slewing body in the hoisting direction and the distal end opposite the proximal end, the attachment being attachable to and detachable from the upper slewing body;

the hoist cargo rope hanging down from the distal end of the attachment and connected to the hoist cargo; and the crane slewing control device controls the slewing drive unit such that the slewing angular velocity of the upper slewing body does not exceed at least the maximum slewing angular velocity set according to the attachment information on the attachment.

* * * * *